(12) United States Patent
Doufas et al.

(10) Patent No.: US 11,629,245 B2
(45) Date of Patent: Apr. 18, 2023

(54) POLYETHYLENE COMPOSITIONS, WIRE AND CABLES, AND METHODS FOR MAKING THE SAME

(71) Applicant: ExxonMobil Chemical Patents Inc., Baytown, TX (US)

(72) Inventors: Antonios K. Doufas, Houston, TX (US); Giriprasath Gururajan, Missouri City, TX (US); Adam Struppeck, Houston, TX (US); Christopher S. Breiner, Pasadena, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 78 days.

(21) Appl. No.: 17/056,333

(22) PCT Filed: Jun. 26, 2019

(86) PCT No.: PCT/IB2019/001427
§ 371 (c)(1),
(2) Date: Nov. 17, 2020

(87) PCT Pub. No.: WO2020/109870
PCT Pub. Date: Jun. 4, 2020

(65) Prior Publication Data
US 2021/0309842 A1 Oct. 7, 2021

Related U.S. Application Data

(60) Provisional application No. 62/691,444, filed on Jun. 28, 2018.

(51) Int. Cl.
*H01B 7/02* (2006.01)
*C08L 23/08* (2006.01)
(Continued)

(52) U.S. Cl.
CPC ............ *C08L 23/0815* (2013.01); *B29B 7/90* (2013.01); *B29C 35/0866* (2013.01);
(Continued)

(58) Field of Classification Search
CPC ........ H01B 3/441; H01B 7/02; H01B 7/0275; H01B 7/04; H01B 7/06; H01B 7/08;
(Continued)

(56) References Cited

U.S. PATENT DOCUMENTS 5,430,091 A 7/1995 Mahabir et al.
5,795,941 A 8/1998 Cree et al.
(Continued)

OTHER PUBLICATIONS

Kim, Y et al. (1999) "Effect of peroxide modification on melt fracture of linear low density polyethylene during extrusion", Polymer Journal 31, pp. 579-584.
(Continued)

*Primary Examiner* — William H. Mayo, III
(74) *Attorney, Agent, or Firm* — ExxonMobil Chemical Patents Inc.-Law Department

(57) ABSTRACT

Polyethylene compositions described herein have a density from about 0.900 g/cm³ to about 0.950 g/cm³, a MI ($I_2$, 190° C., 2.16 kg) from about 0.1 g/10 min to about 10 g/10 min, an MIR ($I_{21}/I_2$) from about 25 to about 80, an $M_z$ greater than or equal to about 150,000 g/mol, and either an $M_z/M_n$ ratio greater than or equal to about 8.0, an $M_z/M_w$ ratio greater than or equal to about 2.4, or an ($I_2*M_z/M_n$) from about 3 to about 100. The polyethylene compositions are useful in wire and cable, tape, and filament applications, and could be produced using a gas phase or slurry phase, preferably gas phase, polymerization process.

15 Claims, 6 Drawing Sheets

(51) Int. Cl.
| | |
|---|---|
| *B29C 48/154* | (2019.01) |
| *B29C 48/00* | (2019.01) |
| *B29C 48/06* | (2019.01) |
| *B29C 48/91* | (2019.01) |
| *B29B 7/90* | (2006.01) |
| *B29C 35/08* | (2006.01) |
| *H01B 3/44* | (2006.01) |
| *H01B 13/14* | (2006.01) |
| *B29L 31/34* | (2006.01) |
| *H01B 7/00* | (2006.01) |

(52) U.S. Cl.
CPC ............ *B29C 48/022* (2019.02); *B29C 48/06* (2019.02); *B29C 48/154* (2019.02); *B29C 48/91* (2019.02); *H01B 3/441* (2013.01); *H01B 13/14* (2013.01); *B29C 2035/0877* (2013.01); *B29K 2023/06* (2013.01); *B29L 2031/3462* (2013.01); *C08L 2203/202* (2013.01); *H01B 7/00* (2013.01); *H01B 7/02* (2013.01); *H01B 7/0275* (2013.01)

(58) Field of Classification Search
CPC ..... H01B 13/14; B29C 48/154; B29C 48/022; B29C 48/06; B29C 48/91; B29C 48/914; B23B 25/20
USPC ................ 174/110 R–110 PE, 102 R, 113 R; 428/391, 405; 525/288
See application file for complete search history.

(56) References Cited

U.S. PATENT DOCUMENTS

| | | | |
|---|---|---|---|
| 6,242,545 | B1 | 6/2001 | Jejelowo et al. |
| 6,248,845 | B1 | 6/2001 | Loveday et al. |
| 6,492,472 | B2 | 12/2002 | Lue |
| 6,528,597 | B2 | 3/2003 | Loveday et al. |
| 6,936,675 | B2 | 8/2005 | Szul et al. |
| 6,956,088 | B2 | 10/2005 | Farley et al. |
| 7,153,571 | B2 * | 12/2006 | Allermann ............ C08F 283/12 428/405 |
| 7,172,816 | B2 | 2/2007 | Szul et al. |
| 7,179,876 | B2 | 2/2007 | Szul et al. |
| 7,875,670 | B2 * | 1/2011 | Lin ........................ C08L 23/10 524/487 |
| 7,985,801 | B2 * | 7/2011 | Li ............................. D01F 6/04 524/487 |
| 8,183,328 | B2 | 5/2012 | Vigano et al. |
| 8,211,968 | B2 * | 7/2012 | Yang ........................ C08K 5/01 524/848 |
| 8,211,985 | B2 | 7/2012 | Vigano et al. |
| 8,247,065 | B2 | 8/2012 | Best et al. |
| 8,865,834 | B2 | 10/2014 | Vogt et al. |
| 9,284,415 | B2 | 3/2016 | Allermann et al. |
| 2009/0156764 | A1 | 6/2009 | Malakoff et al. |
| 2015/0030867 | A1 * | 1/2015 | German .................. B32B 27/32 525/240 |
| 2015/0210840 | A1 | 7/2015 | Kapur et al. |

OTHER PUBLICATIONS

Sentmanat, M. et al. (2004) "Mechanism of gross melt fracture elimination in the extrusion of polyethylenes in the presence of boron nitride", Rheol. Acta 43, pp. 624-633.

Venet, C. et al. (1997) "Experimental characterization of sharkskin in polyethylene", J. Rheology 41, pp. 873-892.

Vega, et al. (2011) "Eliminating sharkskin distortion in polyethylene extrusion via a molecular route", J. Rheology 55, pp. 855-873.

Sentmanat, M. et al. (2004) "Fingerprinting the processing behavior of polyethylenes from transient extensional flow and peel experiments in the melt state", Rheol Acta 44, pp. 1-15.

* cited by examiner

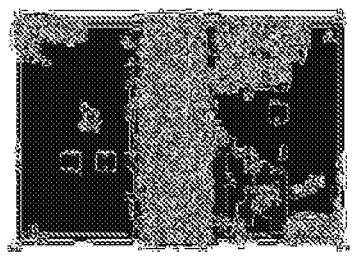 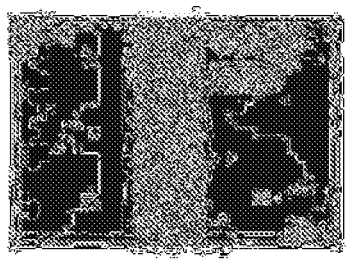 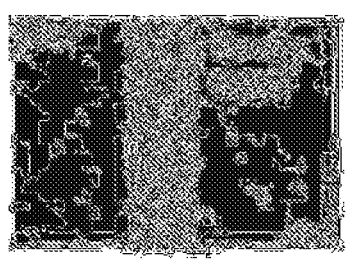
FIG. 1A  FIG. 1B  FIG. 1C
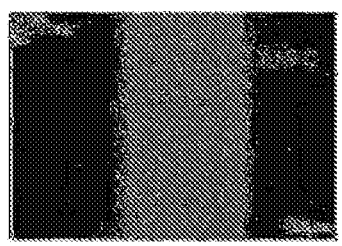 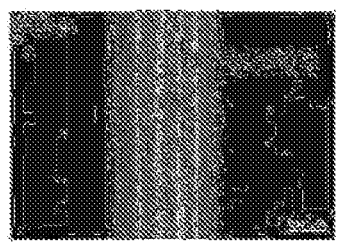 
FIG. 2A  FIG. 2B  FIG. 3A
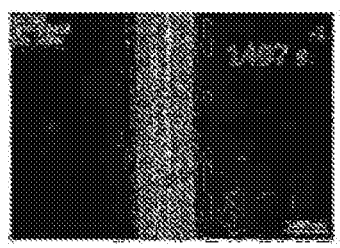 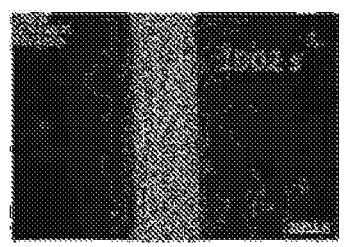 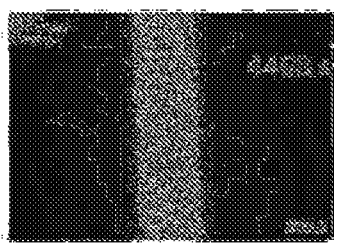
FIG. 3B  FIG. 3C  FIG. 3D

POLYETHYLENE COMPOSITIONS, WIRE AND CABLES, AND METHODS FOR MAKING THE SAME

CROSS-REFERENCE OF RELATED APPLICATIONS

This invention is a National Phase Application claiming priority to PCT Application Serial No. PCT/IB2019/001427, filed Jun. 26, 2019, which claims priority to and the benefit of U.S. Ser. No. 62/691,444, filed Jun. 28, 2018, the disclosures of which are incorporated herein by reference in their entirety.

FIELD OF THE INVENTION

The present disclosure generally relates to polyethylene compositions. The polyethylene composition are useful for producing, for example, wires, cables, tapes, filaments, etc.

BACKGROUND OF THE INVENTION

Use of conventional polyethylene compositions in wire and cable, tape, and filament applications are often limited by shear thinning characteristics and melt fracture of the extrudate produced, leading to surface defects (e.g., surface roughness). Smoother surface appearance at high shear rates can be further problematic.

In particular, in processing wire and cable products and the like, a polyethylene composition can suffer from melt flow instability (e.g., melt fracture, sharkskin, stick-slip, ° gross melt fracture). Melt flow instability can be related to high apparent die shear rates (e.g., 1,000-60,000 s$^{-1}$) and shear stresses of such compositions used to form wire and cable coatings. The high shear rates are a result of high line speeds (e.g., >600 m/min) required to achieve thin layers of polyethylene used in such applications.

For example, linear low density polyethylene ("LLDPE") can experience a high degree of shear flow deformation when extruded through an annular die at high shear rates. However, in wire and/or cable-coating applications, a smooth surface of the polyethylene layer is aesthetically desirable as well as functionally desirable in order to produce a polyethylene layer that has a substantially flawless interface with a conductor layer and to maximize electrical properties performance. In addition, reactive extrusion processing, e.g., silane grafting and/or crosslinking, also impacts the ability to efficiently and effectively process the compositions for these applications. Thus, there is a need for polyethylene compositions which possess good processability and can be extruded at high shear rates to form substantially smooth extrudates, particularly in the case of wire and/or cable coatings where having a substantially smooth surface is needed, as well as a desirable balance of properties.

Blends of conventional Ziegler-Natta ("Z-N") LLDPE or blends of Z-N LLDPE with low density polyethylene ("LDPE") have been used to enhance processability and suppress melt fracture. Exemplary conventional polyethylene compositions useful in such applications are described in, for example, U.S. Pat. Nos. 8,247,065, 7,179,876, 7,172,816, 6,956,088, 6,936,675, 6,528,597, 6,248,845, and 6,242,545.

Another approach includes the use of chromium-based catalyst LLDPE, resulting in low melt fracture sensitivity. However, the drawback of using the Z-N LLDPE/LDPE blends or chromium-based catalyst LLDPE is that certain mechanical properties may be sacrificed (e.g., glancing impact (see, UL 1581, 700.1-700.6) at high loading of flame retardant filler).

A need exists, therefore, for polyethylene compositions that can provide advantages over conventional LLDPE, particularly in terms of melt index ("MI") and shear thinning characteristics, which will lower extrusion pressures and extruder/die temperature to allow faster extrusion rates and smooth extrudates for applications in wire and cable, tape, filament, etc.

SUMMARY OF THE INVENTION

Provided herein are wires or cables having an insulating layer comprising a polyethylene composition having a density from about 0.900 g/cm$^3$ to about 0.950 g/cm$^3$, an MI ($I_2$, 190° C., 2.16 kg) from about 0.1 g/10 min to about 10 g/10 min, a melt index ratio ("MIR") from about 25 to about 80, a z-average molecular weight ("$M_z$") greater than or equal to about 150,000 g/mol, and either an $M_z$/number average molecular weight ("$M_n$") greater than or equal to about 8.0, an $M_z$/weight average molecular weight ("$M_w$") greater than or equal to about 2.4, or an ($I_2$*$M_z$/$M_n$) from about 3 to about 100.

Further provided herein are processes for producing a wire or cable having an insulating layer comprising the steps of: (1) polymerizing ethylene in the presence of a metallocene catalyst system in a gas phase reactor with at least one comonomer of $C_3$ to $C_{10}$ alpha-olefins to produce a polyethylene composition having a density between about 0.900 g/cm$^3$ and about 0.950 g/cm$^3$, an MI between about 0.1 g/10 min and about 10 g/10 min, an MIR between about 25 and about 80, an $M_z$ greater than or equal to about 150,000 g/mol, and either an $M_z$/$M_n$ greater than or equal to about 8.0, an $M_z$/$M_w$ greater than or equal to about 2.4, or an ($I_2$*$M_z$/$M_n$) between about 3 and about 100; and (2) extruding the polyethylene composition.

Also provided are polyethylene compositions having a density between about 0.900 g/cm$^3$ and about 0.950 g/cm$^3$, an MI ($I_2$, 190° C., 2.16 kg) between about 0.1 g/10 min and about 10 g/10 min, an MIR between about 25 and about 80, an $M_z$ greater than or equal to about 150,000 g/mol, and either an $M_z$/$M_n$ ratio greater than or equal to about 8.0, an $M_z$/$M_w$ ratio greater than or equal to about 2.4, or an ($I_2$*$M_z$/$M_n$) between about 3 and about 100.

In an aspect, for the present polyethylene composition, the wire and the cable, and processes for producing the same, the present polyethylene composition described herein is produced using a metallocene catalyst system. In an aspect, the present polyethylene composition herein is produced using a hafnium metallocene catalyst system. In an aspect, the polyethylene composition is produced using a single site hafnium metallocene catalyst system. In an aspect, the present polyethylene composition further comprises less than about 5.0 ppm hafnium. In an aspect, the present polyethylene composition comprises alpha-olefin comonomers. In an aspect, the present polyethylene composition comprises 1-hexene alpha-olefin comonomers. In an aspect, the present polyethylene composition comprises $C_3$ to $C_{10}$ carbon atom alpha-olefin comonomers. In an aspect, the present polyethylene composition is a blend comprising LLDPE, VLDPE, LDPE, MDPE, HDPE and/or EVA copolymers, EMA copolymers, EEA copolymers, EBA copolymers, or a combination thereof. In an aspect, the present polyethylene composition corresponds to an apparent die (wall) shear rate between about 500 s$^{-1}$ and about 20,000 s$^{-1}$. In an aspect, the present polyethylene composition provides a smooth extrudate at an apparent die (wall) shear rate between about 500 s$^{-1}$ and about 20,000 s$^{-1}$ without significant shark-skin or melt fracture by visual observation of stereomicroscopy images of the extrudate. In an aspect, the present polyethylene composition comprises an additive selected from the group of a PPA, antioxidant, nucleator, anti-stat, and slip. In an aspect, the present polyethylene composition comprises a PPA. In an aspect, the present polyethylene composition comprises an insulating or jacketing layer or coating that has an average thickness between about 100 μm and about 5000 μm. In an aspect, the present polyethylene composition comprises an insulating or jacketing layer. In an aspect, the present polyethylene composition is extruded through a die having cylindrical, annular, or slit (flat) geometry. In an aspect, the present polyethylene composition comprises a peroxide compound. In an aspect, the present polyethylene composition is crosslinked via e-beam irradiation after extrusion. In an aspect, the present polyethylene composition has a density between about 0.910 g/cm$^3$ and about 0.930 g/cm$^3$, an MI ($I_2$, 190° C., 2.16 kg) between about 2 g/10 min and about 6 g/10 min, and an MIR ($I_{21}/I_2$) between about 25 and about 50. In an aspect, the present polyethylene composition has a Broad Orthogonal Comonomer Distribution ("BOCD").

BRIEF DESCRIPTION OF THE DRAWINGS

FIG. 1A, FIG. 1B and FIG. 1C are optical micrographs of extrudates made of polyethylene composition having $M_z$ of 240,821 g/mol and $M_z/M_n$ of 10.1 using a 1 mm diameter circular die with an extruder temperature profile of 170-200-210-210° C. at apparent die (wall) shear rates of 4,289 s$^{-1}$, 5,205 s$^{-1}$, and 6120 s$^{-1}$, respectively.

FIG. 2A and FIG. 2B are optical micrographs of extrudates made of polyethylene composition having a density of 0.920 g/cm$^3$ and 1 MI using a 1.871 mm diameter circular die with an extruder temperature profile of 170-200-210-210° C. at apparent die (wall) shear rates of 1040 s$^{-1}$ and 1067 s$^{-1}$, respectively.

FIG. 3A, FIG. 3B, FIG. 3C and FIG. 3D are optical micrographs of extrudates made of polyethylene composition having a density of 0.920 g/cm$^3$ and 1 MI using a 1 mm diameter circular die with an extruder temperature profile of 170-200-210-210° C. at apparent die (wall) shear rates of 1065 s$^{-1}$, 1497 s$^{-1}$, 1902 s$^{-1}$, and 4468 s$^{-1}$, respectively.

FIG. 9 is a histogram showing the incidence and magnitude of surface defects for Sample A.

DESCRIPTION OF THE PREFERRED EMBODIMENTS

Figure 4A:
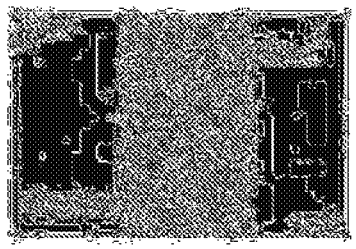
FIG. 4A, FIG. 4B, FIG. 4C and FIG. 4D are optical micrographs of polyethylene compositions, with a PPA, having MIRs of 20, 28, 39.8, and 38.2, respectively, using a 1.871 mm diameter circular die with an extruder temperature profile of 170-200-210-210° C. at apparent die (wall) shear rates of 909 s$^{-1}$, 966 s$^{-1}$, 966 s$^{-1}$, and 1023 s$^{-1}$, respectively.

Before the present compounds, components, compositions, and/or methods are disclosed and described, it is to be understood that unless otherwise indicated this invention is not limited to specific compounds, components, compositions, reactants, reaction conditions, ligands, catalyst structures, metallocene structures, or the like, as such may vary, unless otherwise specified. It is also to be understood that the terminology used herein is for the purpose of describing particular embodiments only and is not intended to be limiting.

Provided herein are polyethylene compositions having a density between 0.900 and 0.950 g/cm$^3$ and being made from a single site metallocene Hf-P catalyst in a single or multiple gas phase reactors in series or in parallel. The presently described polyethylene compositions comprise metallocene-catalyzed LLDPE, and/or blends of LLDPE and one or more additional polymers. The subject polyethylene compositions have an MI ($I_2$) of about 0.1-10 g/10 min and an MIR in the range of about 25-80. In an aspect the MIR >25. We have found that the MI and MIR combination of the present polyethylene compositions provides excellent shear thinning characteristics with no melt fracture of the extrudate and smoother surface appearance at high apparent die shear rates.

In polymer processing, increased production rate is desired without sacrificing product quality. A. V. Ramamurthy, *Wall Slip in Viscous Fluids and Influence of Materials of Construction*, 30 J RHEOLOGY 337, 337-357 (1986). However, melt fracture phenomena, such as sharkskin (small amplitude periodic distortions occurring as surface defect), stick-slip or oscillating melt fracture (alternating smooth and distorted portions of surface), and gross melt fracture (large amplitude/chaotic distortions occurring as volume defect) pose a limit to maximum rates of production. Id.; Savvas G Hatzikiriakos & John M. Dealy, *Role of Slip and Fracture in the Oscillating Flow of HDPE in a Capillary*, 36 J RHEOLOGY 845, 845-884 (1992); POLYMER PROCESSING INSTABILITIES: CONTROL AND UNDERSTANDING 121-207 (Savvas G. Hatzikiriakos & Kalman B. Migler eds., Marcel Dekker, New York 2004) (2004). Ways of overcoming such limitations and/or postponing such phenomena to higher rates are highly desired. The determination of the transition from smooth surface to sharkskin, stick-slip, and gross melt fracture regimes is done via visual observation of extrudates, e.g. via optical microscopy images. Delgadillo-Velázquez et al., *Sharkskin and oscillating melt fracture: Why in Slit and Capillary Dies and Not in Annular Dies?*, POLYMER ENGINEERING AND SCI. v. 48(2), pp. 405-414 (2008); JOHN M. DEALY & KURT F. WISSBRUN, MELT RHEOLOGY AND ITS ROLE IN PLASTICS PROCESSING: THEORY AND APPLICATIONS 337-38 (Van Nostrand Reinhold 1990) (1990).

The polyethylene compositions have an $M_z$ greater than or equal to about 150,000 g/mol and either an $M_z/M_n$ ratio greater than or equal to about 8.0, an $M_z/M_w$ ratio greater than or equal to about 2.4, or an ($I_2*M_z/M_n$) between about 3 and about 100. As provided herein, the combination of $M_z$ and either $M_z/M_n$, $M_z/M_w$, or ($I_2*M_z/M_n$) surprisingly favors smooth extrudate profile. Present polyethylene compositions having these molecular weight combinations can be achieved by other post-reactor modifications of polyethylene compositions (e.g. extruder blending) or using mixed catalyst systems in a single or multiple gas phase reactors in series or in parallel.

Hence, subject polyethylene compositions offer increased throughput and melt strength advantages that facilitate processing and fabrication during profile extrusion. With a single-site metallocene type catalyst, better control of crystallinity is achievable and superior physical and mechanical properties with low impurities (better catalyst efficiencies) are observed. As described, these polyethylene compositions can be utilized in applications such as wire and cable, tape, filament, and fiber facilitating fabrication with a smooth profile. The present articles can be prepared at high die shear rates greater than 5,000 s$^{-1}$ which provides favorable physical properties and smoother surface appearance.

For the purposes of this disclosure, the following definitions will apply:

As used herein, the terms "a" and "the" as used herein are understood to encompass the plural as well as the singular.

The term "alpha-olefin" refers to an olefin having a terminal carbon-to-carbon double bond in the structure thereof ($(R^1R^2)$—C=CH$_2$, where $R^1$ and $R^2$ can be independently hydrogen or any hydrocarbyl group. In an aspect, $R^1$ is hydrogen, and $R^2$ is an alkyl group. A "linear alpha-olefin" is an alpha-olefin defined in this paragraph wherein $R^1$ is hydrogen, and $R^2$ is hydrogen or a linear alkyl group.

The term "cable" refers to an electrical conductor or strands of metal wire, and often insulated, or a combination of electrical conductors insulated from one another.

A "catalyst system" as used herein may include one or more polymerization catalysts, activators, supports/carriers, or any combination thereof, and the terms "catalyst" and "catalyst system" are intended to be used interchangeably herein. The term "supported" as used herein refers to one or more compounds that are deposited on, contacted with, vaporized with, bonded to, or incorporated within, adsorbed or absorbed in, or on, a support or carrier. The terms "support" or "carrier" for purposes of this specification are used interchangeably and are any support material, or a porous support material, including inorganic or organic support materials. Non-limiting examples of inorganic support materials include inorganic oxides and inorganic chlorides. Other carriers include resinous support materials such as polystyrene, functionalized or organic supports, such as polystyrene, divinyl benzene, polyolefins, or polymeric compounds, zeolites, talc, clays, or any other organic or inorganic support material and the like, or mixtures thereof.

The term "composition distribution breadth index" or "CDBI" refers to the weight percent of the copolymer molecules having a comonomer content within 50% of the median total molar comonomer content. The CDBI of any copolymer is determined utilizing known techniques for isolating individual fractions of a sample of the copolymer. Exemplary is Temperature Rising Elution Fraction (TREF), as described in Wild, et al., *J. Poly. Sci., Poly. Phys. Ed.*, v. 20, pg. 441 (1982) and as well as in U.S. Pat. No. 5,008,204.

As used herein, the term "copolymer" means polymers having more than one type of monomer, including interpolymers, terpolymers, or higher order polymers.

The term "$C_n$" group or compound refers to a group or a compound with total number carbon atoms "n." Thus, a "$C_m$-$C_n$" group or compound refers to a group or compound having total number of carbon atoms in a range from m to n. For example, a $C_1$-$C_{50}$ alkyl group refers to an alkyl compound having 1 to 50 carbon atoms.

As used herein, the terms, "cyclopentadiene" and "cyclopentadienyl" are abbreviated as Cp.

All numerical values within the detailed description and the claims herein are modified by "about" or "approximately" the indicated value, taking into account experimental error and variations.

The term "density" as used herein, and unless otherwise specified, refers to the density of the polymer independent of any additives, such as antiblocks, which may change the tested value. As used herein, when a polymer or copolymer is referred to as comprising an olefin, the olefin present in such polymer or copolymer is the polymerized form of the olefin. For example, when a copolymer is said to have a "propylene" content of 35 wt % to 55 wt %, it is understood that the mer unit in the copolymer is derived from propylene in the polymerization reaction and said derived units are present at 35 wt % to 55 wt %, based upon the weight of the copolymer. A copolymer can be terpolymers and the like.

Certain of the present polyethylene compositions are sold under the ENABLE® trademark, including metallocene polyethylene compositions ("ENABLE® mPE"), which are available from ExxonMobil Chemical Company. ENABLE® mPE polyethylene compositions balance processability and mechanical properties, including tensile strength and elongation to break with advanced drawdown and enhanced pipe rupture (failure) time and toughness. Applications for ENABLE® products include food packaging, form fill and seal packaging, heavy duty bags, lamination film, stand up pouches, multilayer packaging film, and shrink film.

For example, ENABLE 2010HA is a metallocene ethylene 1-hexene copolymer having a processing aid additive, a thermal stabilizer additive, a density of about 0.920 g/cm$^3$, and an MI (I$_2$) of about 1.0 g/10 min.

Likewise, ENABLE 2005HH is yet another metallocene ethylene 1-hexene copolymer having a processing aid additive, a thermal stabilizer, a density of about 0.920 g/cm$^3$, and an MI (I$_2$) of about 0.5 g/10 min.

Certain of the present polyethylene compositions are sold under the EXCEED XP® trademark, including metallocene polyethylene compositions ("EXCEED XP® mPE"), which are available from ExxonMobil Chemical Company. EXCEED XP™ mPE offers step-out performance with respect to, for example, dart drop impact strength, flex-crack resistance, and machine direction (MD) tear, as well as maintaining stiffness at lower densities. EXCEED XP™ mPE also offers optimized solutions for a good balance of melt strength, toughness, stiffness, and sealing capabilities which makes this family of polymers well-suited for blown film/sheet solutions.

For example, EXCEED XP 6026 is an LLDPE polyethylene 1-hexene copolymer having a processing aid additive, a thermal stabilizer additive, a density of about 0.916 g/cm$^3$, and an MI (I$_2$) of about 0.20 g/10 min.

As used herein, in reference to Periodic Table "Groups" of Elements, the "new" numbering scheme for the Periodic Table Groups are used as in the CRC HANDBOOK OF CHEMISTRY AND PHYSICS (David R. Lide ed., CRC Press 81$^{st}$ ed. 2000).

The term "layer" means and includes, but is not limited to, a coating, an insulating layer, a jacketing layer, an insulating coating, or a jacketing coating.

As used herein, the term LLDPE means polyethylene copolymers having a significant number of short branches. LLDPEs can be distinguished structurally from conventional LDPEs as LLDPEs typically have minimal long chain branching and more short chain branching than LDPEs.

The term "long chain branching" means a polyethylene composition having one or more branches with molecular weight of at least about 1 kg/mol.

The terms "metallocene catalyzed LLDPE" and "mLLDPE" mean an LLDPE produced with a metallocene catalyst.

The term linear medium density polyethylene ("MDPE") refers to a polyethylene copolymer having a density from about 0.930 g/cm$^3$ to about 0.950 g/cm$^3$. Polymers having more than two types of monomers, such as terpolymers, are also included within the term "copolymer."

As used herein, the term "metallocene catalyst" refers to a catalyst having at least one transition metal compound containing one or more substituted or unsubstituted Cp moiety (typically two Cp moieties) in combination with a Group 4, 5, or 6 transition metal. A metallocene catalyst is considered a single site catalyst. Metallocene catalysts generally require activation with a suitable co-catalyst, or activator, in order to yield an "active metallocene catalyst", i.e., an organometallic complex with a vacant coordination site that can coordinate, insert, and polymerize olefins. Active catalyst systems generally include not only the metallocene complex, but also an activator, such as an alumoxane or a derivative thereof (preferably methyl alumoxane), an ionizing activator, a Lewis acid, or a combination thereof. Alkylalumoxanes (typically methyl alumoxane and modified methylalumoxanes) are particularly suitable as catalyst activators. The catalyst system can be supported on a carrier, typically an inorganic oxide or chloride or a resinous material such as, for example, polyethylene or silica. When used in relation to metallocene catalysts, the term "substituted" means that a hydrogen group has been replaced with a hydrocarbyl group, a heteroatom, or a heteroatom containing group. For example, methylcyclopentadiene is a Cp group substituted with a methyl group.

The term "MI" is the number of grams extruded in 10 minutes under the action of a standard load and is an inverse measure of viscosity. A high MI implies low viscosity and low MI means high viscosity. In addition, polymers are shear thinning, which means that their resistance to flow decreases as the shear rate increases. This is due to molecular alignments in the direction of flow and disentanglements.

As provided herein, MI (I$_2$, 190° C., 2.16 kg) is determined according to ASTM D-1238-E, also sometimes referred to as I$_2$ or I$_{2.16}$.

As provided herein, MI (I$_{21}$, 190° C., 21.6 kg) is determined according to ASTM D-1238-E, also sometimes referred to as I$_{21}$ or I$_{21.6}$.

The term "MIR" is the ratio of I$_{21}$/I$_2$ and provides an indication of the amount of shear thinning behavior of the polymer and a parameter that might be correlated to the overall polymer mixture molecular weight distribution ("MWD") data obtained separately by using Gas Permeation Chromatography ("GPC") and possibly in combination with another polymer analysis including TREF.

Density is measured in accordance with ASTM D-1505.

As used herein, "M$_n$" is number average molecular weight, "M$_w$" is weight average molecular weight, and "M$_z$" is z-average molecular weight. Unless otherwise noted, all molecular weight units (e.g., M$_w$, M$_n$, M$_z$) including molecular weight data are in the unit of g·mol$^{-1}$.

As used herein, unless specified otherwise, percent by mole is expressed as "mol %," and percent by weight is expressed as "wt %."

MWD is equivalent to the expression M$_w$/M$_n$ and is also referred to as polydispersity index (PDI). The expression M$_w$/M$_n$ is the ratio of the M$_w$ to the M$_n$. The M$_w$ is given by $$M_w = \frac{\sum_i n_i M_i^2}{\sum_i n_i M_i},$$

the M$_n$ is given by $$M_n = \frac{\sum_i n_i M_i}{\sum_i n_i},$$

the M$_z$ is given by $$M_z = \frac{\sum_i n_i M_i^3}{\sum_i n_i M_i^2},$$

where n$_i$ in the foregoing equations is the number fraction of molecules of molecular weight M$_i$. Measurements of M$_w$, M$_z$, and M$_n$ are typically determined by Gel Permeation Chromatography as disclosed in Macromolecules, v. 34(19), pg. 6812 (2001). The measurements proceed as follows. Gel Permeation Chromatography (Agilent PL-220), equipped with three in-line detectors, a differential refractive index detector ("DRI"), a light scattering (LS) detector, and a viscometer, is used. Experimental details, including detector calibration, are described in: T. Sun, P. Brant, R. R. Chance, and W. W. Graessley, Macromolecules, Volume v. 34(19), pp. 6812-6820, (2001). Three Agilent PLgel 10 µm Mixed-B LS columns are used. The nominal flow rate is 0.5 mL/min, and the nominal injection volume is 300 µL. The various transfer lines, columns, viscometer and differential refractometer (the DRI detector) are contained in an oven maintained at 145° C. Solvent for the experiment is prepared by dissolving 6 grams of butylated hydroxytoluene as an antioxidant in 4 liters of Aldrich reagent grade 1,2,4-trichlorobenzene (TCB). The TCB mixture is then filtered through a 0.1 µm Teflon filter. The TCB is then degassed with an online degasser before entering the GPC-3D. Polymer solutions are prepared by placing dry polymer in a glass container, adding the desired amount of TCB, then heating the mixture at 160° C. with continuous shaking for about 2 hours. All quantities are measured gravimetrically. The TCB densities used to express the polymer concentration in mass/volume units are 1.463 g/ml at about 21° C. and 1.284 g/ml at 145° C. The injection concentration is from 0.5 to 2.0 mg/ml, with lower concentrations being used for higher molecular weight samples. Prior to running each sample, the DRI detector and the viscometer are purged. The flow rate in the apparatus is then increased to 0.5 ml/minute, and the DRI is allowed to stabilize for 8 hours before injecting the first sample. The LS laser is turned on at least 1 to 1.5 hours before running the samples. The concentration, c, at each point in the chromatogram is calculated from the baseline-subtracted DRI signal, I$_{DRI}$, using the following equation:

$$c = K_{DRI} I_{DRI}/(dn/dc),$$

where K$_{DRI}$ is a constant determined by calibrating the DRI, and (dn/dc) is the refractive index increment for the system. The refractive index, n=1.500 for TCB at 145° C. and λ=690 nm. Units on parameters throughout this description of the GPC-3D method are such that concentration is expressed in g/cm$^3$, molecular weight is expressed in g/mole, and intrinsic viscosity is expressed in dL/g.

Unless otherwise indicated, the distribution and the moments of molecular weight (M$_w$, M$_n$, M$_w$/M$_n$, etc.), the comonomer content ($C_2$, $C_3$, $C_6$, etc.), and the branching index ($g'_{vis}$) are determined by using a high temperature Gel Permeation Chromatography (Polymer Char GPC-IR) equipped with a multiple-channel band-filter based Infrared detector IR5, an 18-angle light scattering detector and a viscometer. Three Agilent PLgel 10-μm Mixed-B LS columns are used to provide polymer separation. Aldrich reagent grade 1,2,4-trichlorobenzene (TCB) with 300 ppm antioxidant butylated hydroxytoluene (BHT) is used as the mobile phase. The TCB mixture is filtered through a 0.1 μm Teflon filter and degassed with an online degasser before entering the GPC instrument. The nominal flow rate is 1.0 ml/min and the nominal injection volume is 200 μL. The whole system including transfer lines, columns, and detectors are contained in an oven maintained at 145° C. The polymer sample is weighed and sealed in a standard vial with 80 μL flow marker (Heptane) added to it. After loading the vial in the autosampler, polymer is automatically dissolved in the instrument with 8 ml added TCB solvent. The polymer is dissolved at 160° C. with continuous shaking for about 1 hour for most PE samples or 2 hours for PP samples. The TCB densities used in concentration calculation are 1.463 g/ml at room temperature and 1.284 g/ml at 145° C. The sample solution concentration is from 0.2 to 2.0 mg/ml, with lower concentrations being used for higher molecular weight samples. The concentration (c) at each point in the chromatogram is calculated from the baseline-subtracted IR5 broadband signal intensity (I) using the following equation: $c=\beta I$, where $\beta$ is the mass constant. The mass recovery is calculated from the ratio of the integrated area of the concentration chromatography over elution volume and the injection mass which is equal to the pre-determined concentration multiplied by injection loop volume. The conventional molecular weight (IR MW) is determined by combining universal calibration relationship with the column calibration which is performed with a series of monodispersed polystyrene (PS) standards ranging from 700 to 10M gm/mole. The MW at each elution volume is calculated with the following equation:

$$\log M = \frac{\log(K_{PS}/K)}{a+1} + \frac{a_{PS}+1}{a+1}\log M_{PS},$$

where the variables with subscript "PS" stand for polystyrene while those without a subscript are for the test samples. In this method, $\alpha PS=0.67$ and $KPS=0.000175$ while a and K are for other materials as calculated and published in literature (Sun, T. et al., *Macromolecules*, 2001, v, 34, pg. 6812), except that for purposes of the present disclosure, $\alpha=0.695$ and $K=0.000579$ for linear ethylene polymers, $\alpha=0.705$ and $K=0.0002288$ for linear propylene polymers, $\alpha=0.695$ and $K=0.000181$ for linear butene polymers, $\alpha$ is 0.695 and K is $0.000579*(1-0.0087*w2b+0.000018*(w2b)^2)$ for ethylene-butene copolymer where w2b is a bulk wt % of butene comonomer, $\alpha$ is 0.695, and K is $0.000579*(1-0.0075*w2b)$ for ethylene-hexene copolymer where w2b is a bulk wt % of hexene comonomer, and $\alpha$ is 0.695 and K is $0.000579*(1-0.0077*w2b)$ for ethylene-octene copolymer where w2b is a bulk wt % of octene comonomer. Concentrations are expressed in $g/cm^3$, molecular weight is expressed in g/mole, and intrinsic viscosity (hence K in the Mark-Houwink equation) is expressed in dL/g unless otherwise noted.

The LS detector is the 18-angle Wyatt Technology High Temperature DAWN HELEOSII. The LS molecular weight (M) at each point in the chromatogram is determined by analyzing the LS output using the Zimm model for static light scattering (*Light Scattering from Polymer Solutions*; Huglin, M. B., Ed.; Academic Press, 1972):

$$\frac{K_o c}{\Delta R(\theta)} = \frac{1}{MP(\theta)} + 2A_2 c.$$

Here, $\Delta R(\theta)$ is the measured excess Rayleigh scattering intensity at scattering angle $\theta$, c is the polymer concentration determined from the IR5 analysis, $A_2$ is the second virial coefficient, $P(\theta)$ is the form factor for a monodisperse random coil, and $K_o$ is the optical constant for the system:

$$K_o = \frac{4\pi^2 n^2 (dn/dc)^2}{\lambda^4 N_A},$$

where $N_A$ is Avogadro's number, and (dn/dc) is the refractive index increment for the system. The refractive index, n=1.500 for TCB at 145° C. and $\lambda$=665 nm. For analyzing polyethylene homopolymers, ethylene-hexene copolymers, and ethylene-octene copolymers, dn/dc=0.1048 ml/mg and $A_2$=0.0015; for analyzing ethylene-butene copolymers, dn/dc=0.1048*(1−0.00126*w2) ml/mg and $A_2$=0.0015 where w2 is wt % butene comonomer.

A high temperature Agilent (or Viscotek Corporation) viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_S$, for the solution flowing through the viscometer is calculated from their outputs. The intrinsic viscosity, [η], at each point in the chromatogram is calculated from the equation $[\eta]=\eta_S/c$, where c is concentration and is determined from the IR5 broadband channel output. The viscosity MW at each point is calculated as $$M=K_{PS}M^{\alpha_{PS}+1}/[\eta],$$

where $\alpha_{ps}$ is 0.67 and $K_{ps}$ is 0.000175.

The branching index ($g'_{vis}$) is calculated using the output of the GPC-IR5-LS-VIS method as follows. The average intrinsic viscosity, $[\eta]_{avg}$, of the sample is calculated by:

$$[\eta]_{avg} = \frac{\sum c_i [\eta]_i}{\sum c_i},$$

where the summations are over the chromatographic slices, i, between the integration limits.

The branching index $g'_{vis}$ is defined as:

$$g'_{vis} = \frac{[\eta]_{avg}}{KM_v^\alpha},$$

where $M_V$ is the viscosity-average molecular weight based on molecular weights determined by LS analysis and the K and $\alpha$ are for the reference linear polymer, which are, for purposes of the present disclosure, $\alpha$=0.700 and K=0.0003931 for ethylene, propylene, diene monomer copolymers, $\alpha$=0.695 and K=0.000579 for linear ethylene polymers, α=0.705 and K=0.0002288 for linear propylene polymers, α=0.695 and K=0.000181 for linear butene polymers, α is 0.695 and K is 0.000579*(1−0.0087*w2b+ 0.000018*(w2b)^2) for ethylene-butene copolymer where w2b is a bulk wt. % of butene comonomer, α is 0.695 and K is 0.000579*(1−0.0075*w2b) for ethylene-hexene copolymer where w2b is a bulk wt % of hexene comonomer, and α is 0.695 and K is 0.000579*(1−0.0077*w2b) for ethylene-octene copolymer where w2b is a bulk wt % of octene comonomer. Concentrations are expressed in g/cm$^3$, molecular weight is expressed in g/mole, and intrinsic viscosity (hence K in the Mark-Houwink equation) is expressed in dL/g unless otherwise noted. Calculation of the w2b values is as discussed above.

In an aspect, the high viscosity, long-chain branched polyolefins employed in the present disclosure can be prepared by converting solid, high molecular weight, linear, propylene polymer material with irradiating energy as disclosed in U.S. Pat. No. 5,414,027, which is incorporated herein by reference for purposes of U.S. patent practice. Other techniques include treatment of linear polymer with heat and peroxide as disclosed in U.S. Pat. No. 5,047,485, which is incorporated herein by reference for purposes of U.S. patent practice. Other useful high viscosity, long-chain branched polyolefins are disclosed in U.S. Pat. Nos. 4,916,198, 5,047,446, 5,570,595, and European Publication Nos. 0 190 889, 0 384 431, 0 351 866, and 0 634 441, which are also incorporated herein by reference for purposes of U.S. patent practice.

Experimental and analysis details not described above, including how the detectors are calibrated and how to calculate the composition dependence of Mark-Houwink parameters and the second-virial coefficient, are described by T. Sun, P. Brant, R. R. Chance, and W. W. Graessley (*Macromolecules*, 2001, v. 34(19), pp. 6812-6820).

The comonomer composition is determined by the ratio of the IR5 detector intensity corresponding to CH$_2$ and CH$_3$ channels calibrated with a series of PE and PP homo/copolymer standards whose nominal value is predetermined by NMR or FTIR. In particular, this provides the methyls per 1,000 total carbons (CH$_3$/1000TC) as a function of molecular weight. The short-chain branch (SCB) content per 1000TC (SCB/1000TC) is then computed as a function of molecular weight by applying a chain-end correction to the CH$_3$/1000TC function, assuming each chain to be linear and terminated by a methyl group at each end. The wt % comonomer is then obtained from the following expression in which f is 0.3, 0.4, 0.6, 0.8, and so on for C$_3$, C$_4$, C$_6$, C$_8$, and so on co-monomers, respectively.

$$w2 = f * SCB/1000TC,$$

The bulk composition of the polymer from the GPC-IR and GPC-4D analyses is obtained by considering the entire signals of the CH$_3$ and CH$_2$ channels between the integration limits of the concentration chromatogram. First, the following ratio is obtained.

$$\text{Bulk } IR \text{ ratio} = \frac{\text{Area of CH}_3 \text{ signal within integration limits}}{\text{Area of CH}_2 \text{ signal within integration limits}},$$

Then the same calibration of the CH$_3$ and CH$_2$ signal ratio, as mentioned previously in obtaining the CH3/1000TC as a function of molecular weight, is applied to obtain the bulk CH3/1000TC. A bulk methyl chain ends per 1000TC (bulk CH3end/1000TC) is obtained by weight-averaging the chain-end correction over the molecular-weight range. Then $$w2b = f * \text{bulk CH3}/1000TC,$$

$$\text{bulk } SCB/1000TC = \text{bulk CH3}/1000TC - \text{bulk}\frac{\text{CH3end}}{1000TC},$$

and bulk SCB/1000TC is converted to bulk w2 in the same manner as described above.

As used herein, the term "olefin" refers to a linear, branched, or cyclic compound comprising carbon and hydrogen and having a hydrocarbon chain containing at least one carbon-to-carbon double bond in the structure thereof, where the carbon-to-carbon double bond does not constitute a part of an aromatic ring. The term "olefin" is intended to embrace all structural isomeric forms of olefins, unless it is specified to mean a single isomer or the context clearly indicates otherwise.

As used herein, a "polymer" has two or more of the same or different "mer" units. A "homopolymer" is a polymer having mer units that are the same. A "copolymer" is a polymer having two or more mer units that are different from each other. A "terpolymer" is a polymer having three mer units that are different from each other. "Different" in reference to mer units indicates that the mer units differ from each other by at least one atom or are different isomerically.

As used herein, the terms "polymerization temperature" and "reactor temperature" are interchangeable.

As used herein, "shear thinning ratio" refers to the complex viscosity at 190° C. at 0.01 rad/s over the complex viscosity at 190° C. at 100 rad/s (or the nearest measured point).

The term "substantially uniform comonomer distribution" is used herein to mean that comonomer content of the polymer fractions across the molecular weight range of the ethylene-based polymer varies by <10.0 wt %. In an aspect, a substantially uniform comonomer distribution refers to <8.0 wt %, <5.0 wt %, or <2.0 wt %.

In an extrusion process, the term "viscosity" is a measure of resistance to shearing flow. Shearing is the motion of a fluid, layer-by-layer, like a deck of cards. When polymers flow through straight tubes or channels, they are sheared and the resistance is expressed by the viscosity.

Extensional or elongational viscosity is the resistance to stretching. In fiber spinning, film blowing, and other processes where molten polymers are stretched, the elongational viscosity plays a role. For example, for certain liquids, the resistance to stretching can be three times larger than in shearing. For some polymeric liquids, the elongational viscosity can increase (tension stiffening) with the rate, although the shear viscosity decreased.

The term "wire" refers to a string like piece or filament of relatively rigid or flexible metal, typically circular in section, manufactured in a great variety of diameters and metals depending on its application. The term wire can be a thin cylindrical thread of one or more long, continuous fibers.

Conventional Catalysts

Conventional catalysts refer to Z-N catalysts or Phillips-type chromium catalysts. Examples of conventional-type transition metal catalysts are discussed in U.S. Pat. Nos. 4,115,639, 4,077,904 4,482,687, 4,564,605, 4,721,763, 4,879,359 and 4,960,741. The conventional catalyst compounds that may be used in the processes disclosed herein include transition metal compounds from Groups 3 to 10, preferably 4 to 6 of the Periodic Table of Elements.

These conventional-type transition metal catalysts may be represented by the formula:

MRx, where M is a metal from Groups 3 to 10, or Group 4, or titanium; R is a halogen or a hydrocarbyloxy group; and x is the valence of the metal M, preferably x is 1, 2, 3 or 4, or x is 4. Non-limiting examples of R include alkoxy, phenoxy, bromide, chloride and fluoride. Non-limiting examples of conventional-type transition metal catalysts where M is titanium include TiCl3, TiCl4, TiBr4, Ti(OC2H5)3Cl, Ti(OC2H5)Cl3, Ti(OC4H9)3Cl, Ti(OC3H7)2Cl2, Ti(OC2H5)2Br2, TiCl3.1/3AlCl3 and Ti(OC12H25)Cl3.

Conventional chrome catalysts, often referred to as Phillips-type catalysts, may include CrO3, chromocene, silyl chromate, chromyl chloride (CrO2Cl2), chromium-2-ethylhexanoate, chromium acetylacetonate (Cr(AcAc)3). Non-limiting examples are disclosed in U.S. Pat. Nos. 2,285,721, 3,242,099 and 3,231,550.

For optimization, many conventional-type catalysts require at least one cocatalyst. A detailed discussion of cocatalysts may be found in U.S. Pat. No. 7,858,719, Col. 6, line 46, to Col. 7, line 45.

Metallocene Catalysts

Metallocene catalysts (also referred to herein sometimes as metallocenes or metallocene compounds) are generally described as containing one or more ligand(s) and one or more leaving group(s) bonded to at least one metal atom, optionally with at least one bridging group. The ligands are generally represented by one or more open, acyclic, or fused ring(s) or ring system(s) or a combination thereof. These ligands, the ring(s) or ring system(s), can comprise one or more atoms selected from Groups 13 to 16 atoms of the Periodic Table of Elements; in an aspect, the atoms are selected from the group consisting of carbon, nitrogen, oxygen, silicon, sulfur, phosphorous, germanium, boron and aluminum or a combination thereof. Further, the ring(s) or ring system(s) comprise carbon atoms such as, but not limited to, those Cp ligands or Cp-type ligand structures or other similar functioning ligand structures such as a pentadiene, a cyclooctatetraendiyl, or an imide ligand. The metal atom can be selected from Groups 3 through 15 and the lanthanide or actinide series of the Periodic Table of Elements. The metal is a transition metal from Groups 4 through 12, Groups 4, 5 and 6, and the transition metal is from Group 4.

Exemplary metallocene catalysts and catalyst systems are described in, for example, U.S. Pat. Nos. 4,530,914, 4,871,705, 4,937,299, 5,017,714, 5,055,438, 5,096,867, 5,120,867, 5,124,418, 5,198,401, 5,210,352, 5,229,478, 5,264,405, 5,278,264, 5,278,119, 5,304,614, 5,324,800, 5,347,025, 5,350,723, 5,384,299, 5,391,790, 5,391,789, 5,399,636, 5,408,017, 5,491,207, 5,455,366, 5,534,473, 5,539,124, 5,554,775, 5,621,126, 5,684,098, 5,693,730, 5,698,634, 5,710,297, 5,712,354, 5,714,427, 5,714,555, 5,728,641, 5,728,839, 5,753,577, 5,767,209, 5,770,753, 5,770,664; European Patent Nos. EP-A-0 591 756, EP-A-0 520-732, EP-A-0 420 436, EP-B1 0 485 822, EP-B1 0 485 823, EP-A2-0 743 324, EP-B1 0 518 092; and PCT Publication Nos. WO 91/04257, WO 92/00333, WO 93/08221, WO 93/08199, WO 94/01471, WO 96/20233, WO 97/15582, WO 97/19959, WO 97/46567, WO 98/01455, WO 98/06759, and WO 98/011144.

Hafnocenes are generally described throughout in, for example, 1 & 2 METALLOCENE-BASED POLYOLEFINS (John Scheirs & W. Kaminsky eds., John Wiley & Sons, Ltd. 2000); G. G. Hlatky in 181 COORDINATION CHEM. REV. 243-296 (1999) and in particular, for use in the synthesis of polyethylene in 1 METALLOCENE-BASED POLYOLEFINS 261-377 (2000). The hafnocene compounds as described herein include "half sandwich" and "full sandwich" compounds having one or more Cp ligands (Cp and ligands isolobal to Cp) bound to a hafnium atom, and one or more leaving group(s) bound to the hafnium atom. Hereinafter, these compounds will be referred to as "hafnocenes," "metallocenes," or "metallocene catalyst components." The hafnocene may be supported on a support material in an aspect as described further below and may be supported with or without another catalyst component or components.

The Cp ligands are one or more rings or ring system(s), at least a portion of which includes π-bonded systems, such as cycloalkadienyl ligands and heterocyclic analogues. The ring(s) or ring system(s) typically comprise atoms selected from the group consisting of Groups 13 to 16 atoms, and more particularly, the atoms that make up the Cp ligands are selected from the group consisting of carbon, nitrogen, oxygen, silicon, sulfur, phosphorous, germanium, boron and aluminum and combinations thereof, wherein carbon makes up at least 50% of the ring members. Even more particularly, the Cp ligand(s) are selected from the group consisting of substituted and unsubstituted Cp ligands and ligands isolobal to Cp, non-limiting examples of which include Cp, indenyl, fluorenyl and other structures. Further non-limiting examples of such ligands include Cp, cyclopentaphenanthreneyl, indenyl, benzindenyl, fluorenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7H-dibenzofluorenyl, indeno[1,2-9]anthrene, thiophenoindenyl, thiophenofluorenyl, hydrogenated versions thereof (e.g., 4,5,6,7-tetrahydroindenyl, or "H4Ind"), substituted versions thereof (as described in more detail below), and heterocyclic versions thereof.

Metallocene catalyst components as described herein are represented by the formula (I):

$Cp^A Cp^B HfX_n$                Formula (I), wherein each X is chemically bonded to Hf each Cp group is chemically bonded to Hf and n is 0 or an integer from 1 to 4, and either 1 or 2 in an aspect.

The ligands represented by $Cp^A$ and $Cp^B$ in Formula (I) may be the same or different Cp ligands or ligands isolobal to Cp, either or both of which may contain heteroatoms and either or both of which may be substituted by a group R. In an aspect, $Cp^A$ and $Cp^B$ are independently selected from the group consisting of Cp, indenyl, tetrahydroindenyl, fluorenyl, and substituted derivatives of each.

Independently, each $Cp^A$ and $Cp^B$ of Formula (I) may be unsubstituted or substituted with any one or combination of substituent groups R. Non-limiting examples of substituent groups R as used in Formula (I) include hydrogen radicals, alkyls, alkenyls, alkynyls, cycloalkyls, aryls, acyls, aroyls, alkoxys, aryloxys, alkylthiols, dialkylamines, alkylamidos, alkoxycarbonyls, aryloxycarbonyls, carbomoyls, alkyl- and dialkyl-carbamoyls, acyloxys, acylaminos, aroylaminos, and combinations thereof.

More particular non-limiting examples of alkyl substituents R associated with Formula (I) include methyl, ethyl, propyl, butyl, pentyl, hexyl, cyclopentyl, cyclohexyl, benzyl, phenyl, methylphenyl, and tert-butylphenyl groups and the like, including all their isomers, for example tertiary-butyl, isopropyl, and the like. Other possible radicals include substituted alkyls and aryls such as, for example, fluoromethyl, fluroethyl, difluroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)silyl, methylbis(difluoromethyl)silyl, bromomethyldimethylgermyl and the like; and disubstituted boron radicals including dimethylboron for example; and disubstituted Group 15 radicals including dimethylamine, dimethylphosphine, diphenylamine, methylphenylphosphine, Group 16 radicals including methoxy, ethoxy, propoxy, phenoxy, methylsulfide and ethylsulfide. Other substituents R include olefins such as, but not limited to, olefinically unsaturated substituents including vinyl-terminated ligands, for example 3-butenyl, 2-propenyl, 5-hexenyl and the like. In an aspect, at least two R groups, two adjacent R groups in an aspect, are joined to form a ring structure having from 3 to 30 atoms selected from the group consisting of carbon, nitrogen, oxygen, phosphorous, silicon, germanium, aluminum, boron and combinations thereof. Also, a substituent group R group such as 1-butanyl may form a bonding association to the hafnium atom.

Each X in the Formula (I) above and for Formula (II) below is independently selected from the group consisting of: any leaving group in an aspect; halogen ions, hydrides, $C_1$ to $C_{12}$ alkyls, $C_2$ to $C_{12}$ alkenyls, $C_6$ to $C_{12}$ aryls, $C_7$ to $C_{20}$ alkylaryls, $C_1$ to $C_{12}$ alkoxys, $C_6$ to $C_{16}$ aryloxys, $C_7$ to $C_{18}$ alkylaryloxys, $C_1$ to $C_{12}$ fluoroalkyls, $C_6$ to $C_{12}$ fluoroaryls, and $C_1$ to $C_{12}$ heteroatom-containing hydrocarbons and substituted derivatives thereof in an aspect; hydride, halogen ions, $C_1$ to $C_6$ alkyls, $C_2$ to $C_6$ alkenyls, $C_7$ to $C_{18}$ alkylaryls, $C_1$ to $C_6$ alkoxys, $C_6$ to $C_{14}$ aryloxys, $C_7$ to $C_{16}$ alkylaryloxys, $C_1$ to $C_6$ alkylcarboxylates, $C_1$ to $C_6$ fluorinated alkylcarboxylates, $C_6$ to $C_{12}$ arylcarboxylates, $C_7$ to $C_{18}$ alkylarylcarboxylates, $C_1$ to $C_6$ fluoroalkyls, $C_2$ to $C_6$ fluoroalkenyls, and $C_7$ to $C_{18}$ fluoroalkylaryls in an aspect; hydride, chloride, fluoride, methyl, phenyl, phenoxy, benzoxy, tosyl, fluoromethyls and fluorophenyls in an aspect; $C_1$ to $C_{12}$ alkyls, $C_2$ to $C_{12}$ alkenyls, $C_6$ to $C_{12}$ aryls, $C_7$ to $C_{20}$ alkylaryls, substituted $C_1$ to $C_{12}$ alkyls, substituted $C_6$ to $C_{12}$ aryls, substituted $C_7$ to $C_{20}$ alkylaryls and $C_1$ to $C_{12}$ heteroatom-containing alkyls, $C_1$ to $C_{12}$ heteroatom-containing aryls and $C_1$ to $C_{12}$ heteroatom-containing alkylaryls in an aspect; chloride, fluoride, $C_1$ to $C_6$ alkyls, $C_2$ to $C_6$ alkenyls, $C_7$ to $C_{18}$ alkylaryls, halogenated $C_1$ to $C_6$ alkyls, halogenated $C_2$ to $C_6$ alkenyls, and halogenated $C_7$ to $C_{18}$ alkylaryls in an aspect; fluoride, methyl, ethyl, propyl, phenyl, methylphenyl, dimethylphenyl, trimethylphenyl, fluoromethyls (mono-, di- and trifluoromethyls) and fluorophenyls (mono-, di-, tri-, tetra- and pentafluorophenyls) in an aspect.

Other non-limiting examples of X groups in Formula (I) include amines, phosphines, ethers, carboxylates, dienes, hydrocarbon radicals having from 1 to 20 carbon atoms, fluorinated hydrocarbon radicals (e.g., $—C_6F_5$ (pentafluorophenyl)), fluorinated alkylcarboxylates (e.g., $CF_3C(O)O^-$), hydrides and halogen ions and combinations thereof. Other examples of X ligands include alkyl groups such as cyclobutyl, cyclohexyl, methyl, heptyl, tolyl, trifluoromethyl, tetramethylene, pentamethylene, methylidene, methyoxy, ethyoxy, propoxy, phenoxy, bis(N-methylanilide), dimethylamide, dimethylphosphide radicals and the like. In an aspect, two or more X's form a part of a fused ring or ring system.

In an aspect, the metallocene catalyst component includes those of Formula (I) where $Cp^A$ and $Cp^B$ are bridged to each other by at least one bridging group, (A), such that the structure is represented by Formula (II):

$$Cp^A(A)Cp^BHfX_n \qquad \text{Formula (II)},$$

These bridged compounds represented by Formula (II) are known as "bridged metallocenes." $Cp^A$, $Cp^B$, X and n are as defined above for Formula (I); and wherein each Cp ligand is chemically bonded to Hf, and (A) is chemically bonded to each Cp. Non-limiting examples of bridging group (A) include divalent hydrocarbon groups containing at least one Group 13 to 16 atom, such as but not limited to at least one of a carbon, oxygen, nitrogen, silicon, aluminum, boron, germanium and tin atom and combinations thereof; wherein the heteroatom may also be $C_1$ to $C_{12}$ alkyl or aryl substituted to satisfy neutral valency. The bridging group (A) may also contain substituent groups R as defined above (for Formula (I)) including halogen radicals and iron. More particular non-limiting examples of bridging group (A) are represented by $C_1$ to $C_6$ alkylenes, substituted $C_1$ to $C_6$ alkylenes, oxygen, sulfur, $R'_2C=$, $R'_2Si=$, $—Si(R')_2Si(R'_2)—$, $R'_2Ge=$, $R'P=$ (wherein "=" represents two chemical bonds), where R' is independently selected from the group consisting of hydride, hydrocarbyl, substituted hydrocarbyl, halocarbyl, substituted halocarbyl, hydrocarbyl-substituted organometalloid, halocarbyl-substituted organometalloid, disubstituted boron, disubstituted Group 15 atoms, substituted Group 16 atoms, and halogen radical; and wherein two or more R' may be joined to form a ring or ring system. In an aspect, the bridged metallocene catalyst component of Formula (II) has two or more bridging groups (A).

Other non-limiting examples of bridging group (A) include methylene, ethylene, ethylidene, propylidene, isopropylidene, diphenylmethylene, 1,2-dimethylethylene, 1,2-diphenylethylene, 1,1,2,2-tetramethylethylene, dimethylsilyl, diethylsilyl, methyl-ethylsilyl, trifluoromethylbutylsilyl, bis(trifluoromethyl)silyl, di(n-butyl)silyl, di(n-propyl)silyl, di(i-propyl)silyl, di(n-hexyl)silyl, dicyclohexylsilyl, diphenylsilyl, cyclohexylphenylsilyl, t-butylcyclohexylsilyl, di(t-butylphenyl)silyl, di(p-tolyl)silyl and the corresponding moieties wherein the Si atom is replaced by a Ge or a C atom; dimethylsilyl, diethylsilyl, dimethylgermyl and diethylgermyl.

In an aspect, bridging group (A) may also be cyclic, comprising, for example, 4 to 10 ring members in an aspect and 5 to 7 ring members in an aspect. The ring members may be selected from the elements mentioned above, from one or more of B, C, Si, Ge, N and O in an aspect. Non-limiting examples of ring structures which may be present as or part of the bridging moiety are cyclobutylidene, cyclopentylidene, cyclohexylidene, cycloheptylidene, cyclooctylidene and the corresponding rings where one or two carbon atoms are replaced by at least one of Si, Ge, N and O, in particular, Si and Ge. The bonding arrangement between the ring and the Cp groups may be either cis-, trans-, or a combination.

The cyclic bridging groups (A) may be saturated or unsaturated and/or carry one or more substituents and/or be fused to one or more other ring structures. If present, the one or more substituents are selected from the group consisting of hydrocarbyl (e.g., alkyl such as methyl) and halogen (e.g., F, Cl) in an aspect. The one or more Cp groups which the above cyclic bridging moieties may optionally be fused to may be saturated or unsaturated and are selected from the group consisting of those having 4 to 10, more particularly 5, 6 or 7 ring members (selected from the group consisting of C, N, O and S in an aspect) such as, for example, cyclopentyl, cyclohexyl and phenyl. Moreover, these ring structures may themselves be fused such as, for example, in the case of a naphthyl group. Moreover, these (optionally fused) ring structures may carry one or more substituents. Illustrative, non-limiting examples of these substituents are hydrocarbyl (particularly alkyl) groups and halogen atoms.

Hafnocenes include, but are not limited to, bis(n-propyl cyclopentadienyl) hafnium dichloride, bis(n-propyl cyclopentadienyl) hafnium difluoride, bis(n-propyl cyclopentadienyl) hafnium dimethyl, bis(n-propyl cyclopentadienyl) hafnium dihydride, bis(2-propenylcyclopentadienyl) hafnium dichloride, bis(2-propenylcyclopentadienyl) hafnium difluoride, bis(2-propenylcyclopentadienyl) hafnium dimethyl, bis(n-butyl cyclopentadienyl) hafnium dichloride, bis(n-butyl cyclopentadienyl) hafnium difluoride, bis(n-butyl cyclopentadienyl) hafnium dimethyl, bis(3-butenylcyclopentadienyl) hafnium dichloride, bis(3-butenylcyclopentadienyl) hafnium difluoride, bis(3-butenylcyclopentadienyl) hafnium dimethyl, bis(n-pentyl cyclopentadienyl) hafnium dichloride, bis(n-pentyl cyclopentadienyl) hafnium difluoride, bis(n-pentyl cyclopentadienyl) hafnium dimethyl, (n-propyl cyclopentadienyl)(n-butyl cyclopentadienyl) hafnium dichloride or dimethyl, bis(trimethylsilylmethylcyclopentadienyl) hafnium dichloride, bis[(2-trimethylsilyl-ethyl) cyclopentadienyl] hafnium dichloride or dimethyl, bis(trimethylsilyl cyclopentadienyl) hafnium dichloride or dimethyl or dihydride, bis(2-n-propyl indenyl) hafnium dichloride or dimethyl, bis(2-n-butyl indenyl) hafnium dichloride or dimethyl, dimethylsilyl bis(n-propyl cyclopentadienyl) hafnium dichloride or dimethyl, dimethylsilyl bis(n-butyl cyclopentadienyl) hafnium dichloride or dimethyl, bis(9-n-propyl fluorenyl) hafnium dichloride or dimethyl bis(9-n-butyl fluorenyl) hafnium dichloride or dimethyl, (9-n propyl fluorenyl)(2-n-propyl indenyl) hafnium dichloride or dimethyl, bis(1,2-n-propyl, methyl cyclopentadienyl) hafnium dichloride or dimethyl, bis(1,3-n-propylmethylcyclopentadienyl) hafnium dichloride, (n-propyl cyclopentadienyl) (1,3-n-propyl, n-butyl cyclopentadienyl) hafnium dichloride or dimethyl and the like.

Activators

Typically, the catalyst described above is activated towards olefin polymerization using one or more activators. As used herein, the term "activator" is defined to be any compound or combination of compounds, supported or unsupported, which can activate a single-site catalyst compound, such as a metallocene, by creating a cationic species from the catalyst component. Typically, this involves the abstraction of at least one leaving group from the metal center of the catalyst component. Aspects of such activators include Lewis acids such as cyclic or oligomeric poly (hydrocarbylaluminum oxides) and so called non-coordinating activators ("NCA") (alternately, "ionizing activators" or "stoichiometric activators"), or any other compound that can convert a neutral metallocene catalyst component to a metallocene cation that is active with respect to olefin polymerization.

More particularly, Lewis acids such as alumoxane (e.g., "MAO"), modified alumoxane (e.g., "TIBAO"), and alkylaluminum compounds as activators, and/or ionizing activators (neutral or ionic) such as tri (n-butyl)ammonium tetrakis (pentafluorophenyl)boron and/or a trisperfluorophenyl boron metalloid precursors can be used. Ionizing activators are described by, for example, Eugene You-Xian Chen & Tobin J. Marks, "Cocatalysts for Metal-Catalyzed Olefin Polymerization: Activators, Activation Processes, and Structure-Activity Relationships," *Chemical Reviews*, v. 100(4), pp. 1391-1434 (2000). The activators may be associated with or bound to a support, either in association with the catalyst component (e.g., metallocene) or separate from the catalyst component, such as described by Gregory G. Hlatky, "Heterogeneous Single-Site Catalysts for Olefin Polymerization," *Chemical Reviews*, v. 100(4) pp. 1347-1374 (2000).

The aluminum alkyl ("alkylaluminum") activator may be described by the formula $AlR^\S_3$, wherein $R^\S$ is selected from the group consisting of $C_1$ to $C_{20}$ alkyls, $C_1$ to $C_{20}$ alkoxys, halogen (chlorine, fluorine, bromine) $C_6$ to $C_{20}$ aryls, $C_7$ to $C_{25}$ alkylaryls, and $C_7$ to $C_{25}$ arylalkyls. Non-limiting examples of alkylaluminum compounds which may be utilized as activators for the catalyst precursor compounds include trimethylaluminum, triethylaluminum, triisobutylaluminum, tri-n-hexylaluminum, tri-n-octylaluminum and the like.

In general, the activator and catalyst are combined in mole ratios of activator to catalyst component from 1000:1 to 0.1:1, from 300:1 to 1:1 in an aspect, from 150:1 to 1:1 in an aspect, from 50:1 to 1:1 in an aspect, from 10:1 to 0.5:1 in an aspect, and from 3:1 to 0.3:1 in an aspect, wherein a desirable range may include any combination of any upper mole ratio limit with any lower mole ratio limit described herein. When the activator is a cyclic or oligomeric poly (hydrocarbylaluminum oxide) (e.g., MAO), the mole ratio of activator to catalyst component ranges from 2:1 to 100,000:1 in an aspect, from 10:1 to 10,000:1 in an aspect, and from 50:1 to 2,000:1 in an aspect. See, U.S. Pat. Nos. 6,242,545 and 6,248,845 for exemplary hafnocene catalysts and activators.

The hafnocene catalyst systems used herein produce polymers having higher molecular weights in comparison to zirconocene equivalents at the same or similar polymerization conditions. Additionally, the substituted hafnocenes described herein tend to produce lower density polymer products than zirconocene equivalents at substantially the same molecular weight.

Polymerization Process

The catalysts described above are suitable for use in any olefin pre-polymerization or polymerization process or both. Suitable polymerization processes include solution, gas phase, slurry phase, and a high-pressure process, or any combination thereof. A desirable process is a gas phase polymerization of one or more olefin monomers having from 2 to 30 carbon atoms, from 2 to 12 carbon atoms in an aspect, and from 2 to 8 carbon atoms in an aspect. Other monomers useful in the process include ethylenically unsaturated monomers, diolefins having 4 to 18 carbon atoms, conjugated or nonconjugated dienes, polyenes, vinyl monomers and cyclic olefins. Non-limiting monomers may also include norbornene, norbornadiene, isobutylene, isoprene, vinylbenzocyclobutane, styrenes, alkyl substituted styrene, ethylidene norbornene, dicyclopentadiene and cyclopentene.

In an aspect, a copolymer of ethylene derived units and one or more monomers or comonomers is produced. The one or more comonomers are an α-olefin having from 4 to 15 carbon atoms in an aspect, from 4 to 12 carbon atoms in an aspect, and from 4 to 8 carbon atoms in an aspect. The comonomer can be 1-hexene.

Hydrogen gas is often used in olefin polymerization to control the final properties of the polyolefin, such as described in Polypropylene Handbook 76-78 (Hanser Publishers, 1996). Increasing concentrations (partial pressures) of hydrogen increase the melt flow rate (MFR) and/or MI of the polyolefin generated. The MFR or MI can thus be influenced by the hydrogen concentration. The amount of hydrogen in the polymerization can be expressed as a mole ratio relative to the total polymerizable monomer, for example, ethylene, or a blend of ethylene and hexane or propene. The amount of hydrogen used in the polymerization process is an amount necessary to achieve the desired MFR or MI of the final polyolefin composition. The mole ratio of hydrogen to total monomer ($H_2$:monomer) is in a range of from greater than 0.0001 in an aspect, from greater than 0.0005 in an aspect, from greater than 0.001 in an aspect, to less than 10 in an aspect, less than 5 in an aspect, less than 3 in an aspect, and less than 0.10 in an aspect, wherein a desirable range may comprise any combination of any upper mole ratio limit with any lower mole ratio limit described herein. Expressed another way, the amount of hydrogen in the reactor at any time may range to up to 5,000 ppm, up to 4,000 ppm in an aspect, up to 3,000 ppm in an aspect, between 50 ppm and 5,000 ppm in an aspect, and between 100 ppm and 2,000 ppm in an aspect.

In a gas phase polymerization process, a continuous cycle is often employed where one part of the cycle of a reactor system, a cycling gas stream, otherwise known as a recycle stream or fluidizing medium, is heated in the reactor by the heat of polymerization. This heat is removed from the recycle composition in another part of the cycle by a cooling system external to the reactor. Generally, in a gas fluidized bed process for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer.

The ethylene partial pressure can vary between 80 and 300 psia, or between 100 and 280 psia, or between 120 and 260 psia, or between 140 and 240 psia. More importantly, a ratio of comonomer to ethylene in the gas phase can vary from 0.0 to 0.10, or between 0.005 and 0.05, or between 0.007 and 0.030, or between 0.01 and 0.02.

Reactor pressure typically varies from 100 psig (690 kPa) to 500 psig (3448 kPa). In an aspect, the reactor pressure is maintained within the range of from 200 psig (1379 kPa) to 500 psig (3448 kPa). In an aspect, the reactor pressure is maintained within the range of from 250 psig (1724 kPa) to 400 psig (2759 kPa).

Polyethylene Compositions

As described herein, the subject polyethylene compositions comprise from about 50.0 mol % to 100.0 mol % of units derived from ethylene. The lower limit on the range of ethylene content can be from 50.0 mol %, 75.0 mol %, 80.0 mol %, 85.0 mol %, 90.0 mol %, 92.0 mol %, 94.0 mol %, 95.0 mol %, 96.0 mol %, 97.0 mol %, 98.0 mol %, or 99.0 mol % based on the mol % of polymer units derived from ethylene. The polyethylene composition can have an upper limit on the range of ethylene content of 80.0 mol %, 85.0 mol %, 90.0 mol %, 92.0 mol %, 94.0 mol %, 95.0 mol %, 96.0 mol %, 97.0 mol %, 98.0 mol %, 99.0 mol %, 99.5 mol %, or 100.0 mol %, based on polymer units derived from ethylene.

Further provided herein are polyethylene compositions produced by polymerization of ethylene and, optionally, an alpha-olefin comonomer having from 3 to 10 carbon atoms. Alpha-olefin comonomers are selected from monomers having 3 to 10 carbon atoms, such as $C_3$-$C_{10}$ alpha-olefins or $C_4$-$C_8$ alpha-olefins. Alpha-olefin comonomers can be linear or branched or may include two unsaturated carbon-carbon bonds, i.e., dienes. Examples of suitable comonomers include linear $C_3$-$C_{10}$ alpha-olefins and alpha-olefins having one or more $C_1$-$C_3$ alkyl branches or an aryl group. Comonomer examples include propylene, 1-butene, 3-methyl-1-butene, 3,3-dimethyl-1-butene, 1-pentene, 1-pentene with one or more methyl, ethyl, or propyl substituents, 1-hexene, 1-hexene with one or more methyl, ethyl, or propyl substituents, 1-heptene, 1-heptene with one or more methyl, ethyl, or propyl substituents, 1-octene, 1-octene with one or more methyl, ethyl, or propyl substituents, 1-nonene, 1-nonene with one or more methyl, ethyl, or propyl substituents, ethyl, methyl, or dimethyl-substituted 1-decene, 1-dodecene, and styrene.

Exemplary combinations of ethylene and comonomers include: ethylene 1-butene, ethylene 1-pentene, ethylene 4-methyl-1-pentene, ethylene 1-hexene, ethylene 1-octene, ethylene decene, ethylene dodecene, ethylene 1-butene 1-hexene, ethylene 1-butene 1-pentene, ethylene 1-butene 4-methyl-1-pentene, ethylene 1-butene 1-octene, ethylene 1-hexene 1-pentene, ethylene 1-hexene 4-methyl-1-pentene, ethylene 1-hexene 1-octene, ethylene 1-hexene decene, ethylene 1-hexene dodecene, ethylene propylene 1-octene, ethylene 1-octene 1-butene, ethylene 1-octene 1-pentene, ethylene 1-octene 4-methyl-1-pentene, ethylene 1-octene 1-hexene, ethylene 1-octene decene, ethylene 1-octene dodecene, and combinations thereof. It should be appreciated that the foregoing list of comonomers and comonomer combinations are merely exemplary and are not intended to be limiting. Often, the comonomer is 1-butene, 1-hexene, or 1-octene.

During copolymerization, monomer feeds are regulated to provide a ratio of ethylene to comonomer, e.g., alpha-olefin, so as to yield a polyethylene having a comonomer content, as a bulk measurement, of from about 0.1 mol % to about 20 mol % comonomer. In other embodiments the comonomer content is from about 0.1 mol % to about 4.0 mol %, or from about 0.1 mol % to about 3.0 mol %, or from about 0.1 mol % to about 2.0 mol %, or from about 0.5 mol % to about 5.0 mol %, or from about 1.0 mol % to about 5.0 mol %. The reaction temperature, monomer residence time, catalyst system component quantities, and molecular weight control agent (such as $H_2$) may be regulated so as to provide desired polyethylene compositions. For linear polyethylenes, the amount of comonomers, comonomer distribution along the polymer backbone, and comonomer branch length will generally delineate the density range.

Comonomer content is based on the total content of all monomers in the polymer. The polyethylene copolymer has minimal long chain branching (i.e., less than 1.0 long-chain branch/1,000 carbon atoms, preferably particularly 0.05 to 0.50 long-chain branch/1,000 carbon atoms). Such values are characteristic of a linear structure that is consistent with a branching index (as defined below) of $g'_{vis} \geq 0.980$, 0.985, ≥0.99, ≥0.995, or 1.0. While such values are indicative of little to no long chain branching, some long chain branches can be present (i.e., less than 1.0 long-chain branch/1,000 carbon atoms, preferably less than 0.5 long-chain branch/1,000 carbon atoms, particularly 0.05 to 0.50 long-chain branch/1,000 carbon atoms).

In an aspect, the present polyethylene compositions comprise ethylene-based polymers which include LLDPE produced by gas-phase polymerization of ethylene and, optionally, an alpha-olefin with a catalyst having as a transition metal component a bis(n-$C_{3-4}$ alkyl cyclopentadienyl) hafnium compound, wherein the transition metal component comprises from about 95 to about 99 mol % of the hafnium compound.

Generally, polyethylene can be polymerized in any catalytic polymerization process, including solution phase processes, gas phase processes, slurry phase processes, and combinations of such processes known to those skilled in the art. An exemplary process used to polymerize ethylene-based polymers, such as LLDPEs, is as described in U.S. Pat. Nos. 6,936,675 and 6,528,597, which are each incorporated herein by reference. To produce the present polyethylene compositions, however, a single site metallocene catalyst Hf-P catalyst in a single gas phase process is preferred.

The above-described processes can be tailored to achieve desired polyethylene compositions. For example, comonomer to ethylene concentration or flow rate ratios are commonly used to control composition density. Similarly, hydrogen to ethylene concentrations or flow rate ratios are commonly used to control composition molecular weight.

Polyethylene compositions provided herein can be blends of LLDPE and other polymers, such as additional polymers prepared from ethylene monomers. Exemplary additional polymers are LLDPE, non-linear LDPE, very low density polyethylene ("VLDPE"), MDPE, high density polyethylene ("HDPE"), differentiated polyethylene ("DPE"), and combinations thereof. DPE copolymers include EVA, EEA, EMA, EBA, and other specialty copolymers. The additional polymers contemplated in certain embodiments include ethylene homopolymers and/or ethylene-olefin copolymers.

Polyethylene compositions composed of blended polymers include at least 0.1 wt % and up to 99.9 wt % of LLDPE, and at least 0.1 wt % and up to 99.9 wt % of one or more additional polymers, with these wt % based on the total weight of the polyethylene composition. Alternative lower limits of LLDPE can be 5%, 10%, 20%, 30%, 40%, or 50% by weight. Alternative upper limits of LLDPE can be 95%, 90%, 80%, 70%, 60%, and 50% by weight. Ranges from any lower limit to any upper limit are within the scope of the invention. Preferred blends include more than about 90% LLDPE, and preferably more than about 95% LLDPE. In an aspect, the blends include from 5-85%, alternatively from 10-50% or from 10-30% by weight of the LLDPE. The balance of the weight percentage is the weight of the additional and/or other type of polymers, e.g., different LLDPE, LDPE, VLDPE, MDPE, HDPE, DPE such as EVA, EEA, EMA, EBA, and combinations thereof.

In an aspect, the present polyethylene compositions provided herein have a density in accordance with ASTM D-4703 and ASTM D-1505/ISO 1183 between about 0.900 and about 0.950 g/cm$^3$, between about 0.910 and about 0.920 g/cm$^3$, between about 0.910 and about 0.930 g/cm$^3$, between about 0.910 and about 0.940 g/cm$^3$, between about 0.900 and about 0.925 g/cm$^3$, between about 0.920 and about 0.930 g/cm$^3$, or between about 0.915 and 0.925 g/cm$^3$.

The polyethylene compositions have an $M_z$ greater than or equal to about 150,000 g/mol and either an $M_z/M_n$ ratio greater than or equal to about 8.0, an $M_z/M_w$ ratio greater than or equal to about 2.4, or an $(I_2*M_z/M_n)$ between about 3 and about 100. As provided herein, the combination of $M_z$ and either $M_z/M_n$, $M_z/M_w$, or $(I_2*M_z/M_n)$ surprisingly favors smooth extrudate profile.

The polyethylene compositions may have one or more of the following properties: an MI (190° C./2.16 kg) between about 0.1 g/10 min to about 10 g/10 min; an MIR between about 25 and about 80; an $M_z$ greater than or equal to about 150,000 g/mol; an $M_w/M_n$ greater than or equal to about 8.0; an $M_z/M_w$ greater than or equal to about 2.4; an $(I_2*M_z/M_n)$ between about 3 and about 100; and a density between about 0.900 to about 0.950 g/cm$^3$. The amount of hafnium is greater than the amount of zirconium and a ratio of hafnium to zirconium (ppm/ppm) may be at least about 2.0, at least about 10.0, at least about 15.0, at least about 17.0, at least about 20.0, or at least about 25.0.

More specifically, the subject polyethylene compositions have an MI ($I_2$, 190° C., 2.16 kg) as measured by ASTM D-1238-E of about 0.1 to about 10 g/10 min, about 0.1 g/10 min to about 9 g/10 min, about 0.1 g/10 min to about 8 g/10 min, about 0.1 g/10 min to about 7 g/10 min, about 0.1 g/10 min to about 6 g/10 min, about 0.1 g/10 min to about 5.0 g/10 min, about 0.1 to about 4 g/10 min, about 0.1 g/10 min to about 3.0 g/10 min, about 0.1 g/10 min to about 2.0 g/10 min, and about 0.1 to about 1 g/10 min.

The polyethylene compositions have an MIR ($I_{21.6}/I_{2.16}$) (as defined below) between about 25.0 and about 80.0, between about 35.0 and about 75.0, between about 40.0 and about 70.0, between about 45.0 and about 65.0, between about 50 and about 80, between about 25 and about 40, between about 25 and about 45, and between about 25 and about 50.

In an aspect, the polyethylene compositions can have at least a first peak and a second peak in a comonomer distribution analysis, wherein the first peak has a maximum at a log($M_w$) value of 4.0 to 5.4, 4.3 to 5.0, or 4.5 to 4.7; and a TREF elution temperature of 70.0° C. to 100.0° C., 80.0° C. to 95.0° C., or 85.0° C. to 90.0° C. The second peak in the comonomer distribution analysis has a maximum at a log($M_w$) value of 5.0 to 6.0, 5.3 to 5.7, or 5.4 to 5.6; and a TREF elution temperature of 5.0° C. to 60.0° C. or 10.0° C. to 60.0° C. A description of the TREF methodology is described in U.S. Pat. Nos. 8,431,661 B2 and 6,248,845 B1.

The polyethylene compositions can have a broad orthogonal comonomer distribution. The term "broad orthogonal comonomer distribution" is used herein to mean across the molecular weight range of the ethylene polymer, comonomer contents for the various polymer fractions are not substantially uniform and a higher molecular weight fraction thereof generally has a higher comonomer content than that of a lower molecular weight fraction. Both a substantially uniform and an orthogonal comonomer distribution may be determined using fractionation techniques such as gel permeation chromatography-differential viscometry (GPC-DV), temperature rising elution fraction-differential viscometry (TREF-DV) or cross-fractionation techniques.

The present polyethylene compositions typically have a broad composition distribution as measured by CDBI or solubility distribution breadth index ("SDBI"). For details of determining the CDBI or SDBI of a copolymer, see, for example, PCT Publication No. WO 93/03093, published Feb. 18, 1993. Polymers produced using a catalyst system described herein have a CDBI less than 50%, or less than 40%, or less than 30%. In an aspect, the polymers have a CDBI of from 20% to less than 50%. In an aspect, the polymers have a CDBI of from 20% to 35%. In an aspect, the polymers have a CDBI of from 25% to 28%.

Polyethylene compositions produced using a catalyst system described herein have a SDBI greater than 15° C., or greater than 16° C., or greater than 17° C., or greater than 18° C., or greater than 20° C. In an aspect, the polymers have a SDBI of from 18° C. to 22° C. In an aspect, the polymers have a SDBI of from 18.7° C. to 21.4° C. In an aspect, the polymers have a SDBI of from 20° C. to 22° C.

The present polyethylene compositions are particularly suitable for electrical applications including, but not limited to, insulation, semiconducting or jacketing layers of power cables, telecommunications cables, and combined power/telecommunications cables.

For example, wire and cable applications for polyolefin compositions have been described in U.S. Pat. Nos. 5,795,941; 5,430,091; 7,153,571; 8,183,328; 8,211,985; 9,284,415 and PCT Publication No. WO 2013/137953; See also, Kim, Y. and Yung, K., *Effect of Peroxide Modification on Melt Fracture of LLDPE During Extrusion*, Polymer Journal, v. 31, pp. 579-584 (1999); Sentmanat, M. and Hatzikiriakos, S., *Mechanism of Gross Melt Fracture Elimination in the*

*Extrusion of Polyethylenes in the Presence of Boron Nitride*, Rheol. Acta., v. 43, pp. 624-633 (2004); Venet, C., Vergnes, B., *Experimental Characterization of Sharkskin in Polyethylene*, J. Rheology, v. 41, pp. 873-892 (1997); Vega, J., Exposito, M., Otegui, J., Martinez-Salazar, J., "Eliminating Sharkskin Distortion in Polyethylene Extrusion via a Molecular Route", J. Rheology, v. 55, pp. 855-873 (2011); Sentmanat, M., Muliawan, E., Hatzikiriakos, S., *Fingerprinting the Processing Behavior of Polyethylenes from Transient Extensional Flow and Peel Experiments in the Melt State*, Rheol. Acta., v. 44, pp. 1-15 (2004).

In various aspects, the polyethylene composition may be co-extruded with other polymers to form multilayered structures to further form various articles, such as wire and cable polymer cable-coatings or polymer wire-coating, tape and filaments. As used herein, "multi-layered" refers to structures including two or more polymers each forming a flat or round surface having an average thickness, the same or different, that have been combined together and caused to adhere to one another such as by application of radiation, heat, or use of adhesives to form a single multi-layer structure; preferably formed by a process of coextrusion utilizing two or more extruders to melt and deliver a steady volumetric throughput of different viscous polymers to a single extrusion head (referred to also as a "die") which will extrude the materials in the desired form. In an aspect, the polymer composition is extruded using a single or twin screw extruder.

Optional Additives

The polymer blends described above and/or the extrudate comprising the polymer blend as further described herein may be used in combination with other polymers, additives, PPAs, etc. For example, each layer may comprise a "neat" polymer with optional processing aids and/or additives or may comprise a blend of polymers with optional processing aids and/or additives.

In an aspect, an additive may be present up to 1.0, or 2.0, or 3.0 wt % by weight of the polymer composition described herein. An additive may be added before, during, or after the formation of the polyethylene composition and/or resulting article/extrudate.

First Antioxidant

The first antioxidant comprises one or more antioxidants. They include, but are not limited to, hindered phenols, for example, octadecyl-3-(3,5-di-tert.butyl-4-hydroxyphenyl)-propionate (CAS 002082-79-3), commercially available as IRGANOX™ 1076, pentaerythritol tetrakis (3-(3,5-di-tert-butyl-4-hydroxyphenyl)propionate) (CAS 6683-19-8), commercially available as IRGANOX™ 1010, and combinations thereof. They may be combined with one or more polymers in range from 100 to 4,000 parts by weight of the first antioxidant, based on one million parts of the polymer or polymer composition, alternatively, from 250 to 3,000 parts by weight of the first antioxidant, based on one million parts of the polymer or polymer composition, alternatively, from 500 to 2,500 parts by weight of the first antioxidant, based on one million parts of the polymer or polymer composition, alternatively, from 750 to 2,500 parts by weight of the first antioxidant, based on one million parts of the polymer or polymer composition, alternatively, from 750 to 2,000 parts by weight of the first antioxidant, based on one million parts of the polymer or polymer composition, and alternatively, from 1000 to 2,000 parts by weight of the first antioxidant, based on one million parts of the polymer or polymer composition.

Second Antioxidant

The second antioxidant comprises one or more antioxidants. They include, but are not limited to, liquid phosphites, such as C2-C7, or C2-C4, and alkyl aryl phosphites mixed structures. Non-limiting examples include mono-amylphenyl phosphites, di-amylphenyl phosphites, dimethylpropyl phosphites, 2-methylbutanyl phosphites, and combinations thereof. In several aspects of the invention, the second antioxidant may also be represented by the formula [4-(2-methylbutan-2-yl)phenyl]x[2,4-bis(2-methylbutan-2-yl)phenyl]3-x phosphate, wherein x=0, 1, 2, 3, or combinations thereof. Such antioxidants and their use with polyolefin polymers have been described in U.S. Publication Nos. 2005/0113494, 2007/0021537, 2009/0326112, 2013/0190434, 2013/225738, 2014/0045981 and U.S. Pat. Nos. 5,254,709, 6,444,836, 7,888,414, 7,947,769, 8,008,383, 8,048,946, 8,188,170, and 8,258,214. An example of a commercially available liquid phosphite is sold under the trade name IRGAFOS® 168 (BASF).

The second antioxidant may be combined with one or more polymers in the range from 100 to 4,000 parts by weight of the second antioxidant, based on one million parts of the polymer or polymer composition, alternatively, from 250 to 3,000 parts by weight of the second antioxidant, based on one million parts of the polymer or polymer composition, alternatively, from 300 to 2,000 parts by weight of the second antioxidant, based on one million parts of the polymer or polymer composition, alternatively, from 400 to 1,450 parts by weight of the second antioxidant, based on one million parts of the polymer or polymer composition, alternatively, from 425 to 1,650 parts by weight of the second antioxidant, based on one million parts of the polymer or polymer composition, and alternatively, from 1 to 450 parts by weight of the second antioxidant, based on one million parts of the polymer or polymer composition.

The polymers and/or compositions comprising the first antioxidant and/or the second antioxidant described above may be used in combination with the following neutralizing agents, additional additives, and other components.

Neutralizing Agents

One or more neutralizing agents (also called catalyst deactivators) include, but are not limited to, calcium stearate, zinc stearate, calcium oxide, synthetic hydrotalcite, such as DHT4A, and combinations thereof.

Additional Additives & Other Components

Additional additives and other components include, but are not limited to, fillers (especially, silica, glass fibers, talc, etc.), colorants or dyes, pigments, color enhancers, whitening agents, UV stabilizers, cavitation agents, anti-slip agents, lubricants, plasticizers, processing aids, tackifiers, antistatic agents, acid scavengers (e.g., calcium stearate), antifogging agents, nucleating agents (both α-nucleators and β-nucleators), stabilizers such as lactone and vitamin E, mold release agents, other antioxidants (for example, hindered amines and phosphates), antiblocking agents, antiblooming agents, and other common additives.

Nucleating agents include, for example, sodium benzoate, and talc. Slip agents include, for example, oleamide and erucamide. Additionally, flame retardant fillers may be present in the composition, as described at Column 2 of U.S. Pat. No. 5,430,091 and paragraphs [0044]-[0046] of PCT Publication No. WO 2012/030577.

Nucleating agents may be absent, or α-nucleating agents may be absent, meaning they are not added to the composition or any components of the composition at any stage of the process of formation. Examples of α-nucleating agents include salts of monocarboxylic acids and polycarboxylic acids, sorbitols such as dibenzylidenesorbitol, salts of diesters of phosphoric acid, vinylcycloalkane polymers, and others.

Polymer Processing Aids

The present polyethylene compositions can comprise one or more PPAs, which may be added to the polymer to improve the processing characteristics of the polymer and to eliminate surface related imperfections that occur during processing. The benefits of PPAs include elimination of melt fracture, lower extrusion pressures and motor loads, and improved die/extruder clean up. For example, the addition of PPAs to polyethylene may help prevent sharkskin melt fracture (SSMF or sharkskin), which is a surface imperfection characterized by a pattern of surface ridges perpendicular to the flow direction. Examples of PPAs suitable for use with polyethylene compositions include, without limitation, fluoroelastomers, polyethylene glycol, and low molecular weight PE waxes. In an aspect, the PPA is a fluoroelastomer. As used herein, fluoroelastomer refers to polymers that contain atoms of fluorine. Fluorinated monomers, which may be copolymerized to yield suitable fluoroelastomers, include vinylidene fluoride, hexafluoropropylene, chlorotrifluoroethylene, tetrafluoroethylene and perfluoroalkyl perfluorovinyl ethers. Specific examples of the fluoroelastomers which may be employed include copolymers of vinylidene fluoride and a comonomer selected from hexafluoropropylene, chlorotrifluoroethylene, 1-hydropentafluoropropylene, 2-hydropentafluoropropylene, copolymers of vinylidene fluoride, tetrafluoroethylene, hexafluoropropylene or 1- or 2 hydropentafluoropropylene, and copolymers of tetrafluoroethylene, propylene and, optionally, vinylidene fluoride.

In an aspect, the fluoroelastomer (i) comprises predominantly large particle size fluoroelastomers, for example a weight average particle size of from about 2 to about 10 microns; (ii) has a fluid state at room temperature and above, i.e., has a glass transition temperature (Tg) below room temperature and exhibits little or no crystallinity at room temperature; (iii) comprises an interfacial agent of a polycaprolactone having a $M_n$ in the range of about 1,000 to about 32,000 in a weight ratio of polycaprolactone to fluoroelastomer of less than about 5:1; or (iv) combinations thereof. Alternatively, any fluoroelastomer comprising a caprolactone interfacial agent in a wt % of about 60% may be used. In an aspect, the PPA is a 25 fluoroelastomer known as VITON® FREEFLOW™ Z-200 ("Z-200") produced by Dupont Dow Elastomers of Wilmington, Del. Alternatively, the PPA is a fluoroelastomer known as DYNAMAR FX5929 produced by Dyneon, a 3M Company.

Additional fluoroelastomers suitable for use herein are disclosed in U.S. Pat. No. 6,642,310, which is incorporated herein by reference in its entirety. In some aspects, the fluoroelastomer may be present in the polymeric composition in amounts of about 25 ppm to about 2,000 ppm, alternatively from about 75 ppm to about 1,500 ppm, alternatively from about 100 ppm to about 1,200 ppm, each based on the weight of the base polymer.

Electrical Devices

In an aspect, the present polyethylene compositions provide electrical devices including one or more layers formed of or containing any of the silane-crosslinkable, or silane crosslinked, polyethylene compositions described herein. Such devices include, for example, power cables, telecommunications cables or data transmission cables, and combined power/telecommunications cables.

As used herein, the terms "telecommunications cable" and "data cable" are used interchangeably. When the electrical device is a power cable, it can be a low voltage cable, i.e., a device adapted to transport electricity at a voltage potential of less than or equal to 1 kV or alternatively less than or equal to 6 kV; a medium voltage cable, i.e., a device adapted to transport electricity at a voltage potential of from a lower limit of greater than 1 kV or greater than 6 kV to an upper limit of less than or equal to 35 kV or less 50 than or equal to 66 kV; or a high voltage cable; i.e., a device adapted to transport electricity at a voltage potential of greater than 35 kV or greater than 66 kV. Designations of "low voltage", "medium voltage" and "high voltage", sometimes overlap; for example, a 4 kV cable is sometimes termed "low voltage" and sometimes termed "medium voltage". The range of suitable voltages, and in particular the upper voltage limit, can be used alternatively to characterize a power cable without resort to low/medium/high designations.

U.S. Pat. No. 7,153,571 describes a number of exemplary electrical devices, including power cable configurations, where the present polyethylene composition is useful. A power cable configuration can include a conductor, which may be a plurality of conductive strands but alternatively may be a solid core conductor. The conductor is surrounded in turn by an inner semiconducting layer, an insulating layer, an outer semiconducting layer, a metallic shield layer, and an outer sheath as depicted in FIG. 1 of U.S. Pat. No. 7,153, 571. Any one or more of the layers of the power cable i.e., any semiconducting layer, insulating layer or outer sheath layer, can be formed of, or include, a silane crosslinkable or silane crosslinked polyethylene composition described herein. The cable is particularly suited for transport of electricity at a voltage potential greater than 1 kV or greater than 6 kV up to 35 kV or up to 66 kV.

The conductor can be any suitable electrically conductive material, typically a metal such as copper or aluminum. In any of the aspects herein, the silane crosslinkable or silane crosslinked compositions can be essentially a neat composition, or can further include conventional additives, such as antioxidants, fillers, processing co-adjuvants, lubricants, pigments, and water-tree retardant additives. Further, polymer blends are also contemplated, such as blends of the crosslinkable or crosslinked polyethylene copolymer composition and polyolefin homopolymers or copolymer, olefinester copolymers, polyesters, polyethers, polyether polyester copolymers, and mixtures thereof. Specific examples of polymers that can be included in such polymer mixtures include polyethylenes, polypropylenes, propylene-ethylene thermoplastic copolymers, ethylene-propylene rubbers, ethylenepropylene-diene rubbers, natural rubbers, butyl rubbers, EVA copolymers, EMA copolymers, EEA copolymers, EBA copolymers, and ethylene-alpha-olefin copolymers.

Suitable fillers include inorganic oxides, or inorganic oxides in hydrate or hydroxide form. Examples include oxides or hydroxides of aluminum, bismuth, cobalt, iron, magnesium, titanium and zinc, and the corresponding hydrate forms. Hydroxides are generally used in the form of coated particles, wherein the coating is typically a saturated or unsaturated C8 to C24 fatty acid or a salt thereof, such as, for example, oleic acid, palmitic acid, stearic acid, isostearic acid, lauric acid, magnesium stearate, magnesium oleate, zinc stearate or zinc oleate. Other suitable fillers include glass particles, glass fibers, calcined kaolin, and talc. Typical antioxidants include, for example, polymerized trimethyldihydroquinoline, 4,4'-thiobis(3-methyl 6-tert-bu-10 tyl)phenol; pentaerythryl-tetra [3-(3,5-ditert-butyl-4-hydroxyphenyl) propionate], and 2,2'-thiodiethylene-bis[3-(3,5-ditertbutyl-4-hydroxyphenyl)propionate]. Typical processing co-adjuvants include, for example, calcium stearate, zinc stearate, stearic acid, and paraffin wax.

Electrical devices described herein can be formed by one or more extrusion coating steps in a reactor/extruder equipped with a cable die, and subsequent moisture cure. In a typical extrusion method, an optionally heated conducting core is pulled through a heated extrusion die, typically a cross-head die, in which a layer of melted polymer composition is applied. In an aspect, extrusion is performed using a single or twin screw extruder. Multiple layers can be applied by consecutive extrusion steps in which additional layers are added, or, with the proper type of die, multiple layers can be added simultaneously. The cable can be placed in a moisture curing environment, or it can be allowed to cure under ambient conditions.

In various aspects, the insulating layer/coating/extrudate can have an average thickness of ≤about 5000 μm, ≤about 4000 μm, ≤about 2000 μm, ≤about 1000 μm, ≤about 500 μm, ≤about 250 μm, and ≤about 1500 μm. Additionally, the insulating layer/coating/extrudate can have an average thickness from about 100 μm to about 5000 μm, about 100 μm to about 2500 μm, and about 150 μm to about 1000 μm.

Silane Crosslinking

The present polyethylene compositions are capable of being crosslinked by a reactive unsaturated silane compound. Silane crosslinking processes include, but are not limited to, the commercially available MONOSIL™ process developed by Maillefer and BICC, and the SIOPLAS™ process developed by Dow Corning.

In the SIOPLAS™, or "two-step" process, a polyethylene is first graft-modified in a compounding mixer or extruder with a reactive silane compound and a free radical initiator to produce a silane-grafted polyethylene that can be pelletized and shipped or stored for subsequent processing. The silane-grafted polyethylene is then compounded with a silanol condensation catalyst and melt-extruded in the desired form, such as a pipe or a wire coating layer, followed by curing (crosslinking) by heat and moisture, such as in a water bath or a steam bath. In warm and humid climates, curing can take place under ambient conditions.

In the MONOSIL™ or "one-step" process, the polyethylene, reactive silane compound, free radical initiator, and silanol condensation catalyst are all fed into an extruder and melt extruded in a desired form, such as a pipe or a wire coating layer, followed by curing by heat and moisture, as in the two-step process. The reactive silane compound can be an unsaturated silane compound having one or more hydrolyzable groups. Typical reactive silane compounds include an alkenyl group such as vinyl, allyl, isopropenyl, butenyl, cyclohexenyl, or γ-(meth)acryloxy allyl, and a hydrolyzable group such as a hydrocarbyloxy, hydrocarbonyloxy or hydrocarbylamino group. Specific examples of hydrolyzable groups include methoxy, ethoxy, formyloxy, acetoxy, propionyloxy, and alkylamino or acrylamino groups. A suitable reactive silane is vinyl trimethoxysilane, available as SIL-QUEST™ from OSi Specialties. The amount of silane used is readily determined by one skilled in the art, based on the processing conditions, the specific silane used, and other factors. Amounts of silane compound are from about 0.5 to about 5 phr, where the unit "phr" denotes parts by weight per hundred parts by weight of the polyethylene composition. The free radical initiator can be a peroxide or azo compound which decomposes to form peroxyl or azyl radicals at temperatures suitable for polyethylene palletization, or the free radical initiator can be ionizing radiation. Typical peroxides include, for example, dicumyl peroxide, di-tert-butyl peroxide, t-butyl perbenzoate, benzoyl peroxide, cumene hydroperoxide, t-butyl peroctoate, methyl ethyl ketone peroxide, 2,5-dimethyl-2,5-di(t-butyl peroxy) hexane, lauryl peroxide and tertbutyl peracetate. A suitable azo compound is azobisisobutyl nitrite. A particular peroxide compound is dicumyl peroxide, available commercially as DICUP™R from Hercules. The amount of free radical initiator is readily determined by one skilled in the art, and is typically from about 0.04 to about 0.15 phr. The silanol condensation catalyst can be any compound that promotes the condensation crosslinking reaction, such as organic bases, carboxylic acids, and organometallic compounds including organic titanates and complexes or carboxylates of lead, cobalt, iron, nickel, zinc or tin. Specific catalysts include, for example, dibutyl tin dilaurate, dioctyl tin maleate, dibutyl tin diacetate, dibutyl tin dioctoate, dibutyl tin didodecanoate, stannous acetate, stannous octoate, lead naphthenate, zinc caprylate, and cobalt naphthenate. A particular tin carboxylate is dibutyl tin didodecanoate, available commercially as STANCLERE™TL from Akzo Chemie. The catalyst is used in a catalytically effective amount. Typical catalyst amounts are from about 0.01 to about 0.1 phr. The peroxide-initiated reaction of vinyl trimethoxysilane and polyethylene yields a grafted polymer having a polyethylene backbone structure with pendant ethyltrimethoxysilyl moieties. In the crosslinking reaction, methoxy groups are hydrolyzed to form methanol and pendant ethyldimethoxysilanolyl groups, which undergo condensation reactions with other ethyldimethoxysilanolyl groups to eliminate water and form an Si—O—Si linkage between the pendant silyl moieties. The PE silane grafting and moisture cure (crosslinking) process is also described in Yussuf et al., *Silane Grafting and Crosslinking of Metallocene-catalysed LLDPE and LDPE*, v. 2(2), pp. 58-71 (2007); Tumboli et al., Crosslinked Polyethylene Indian Journal of Chemical Technology, v. 11, pp. 853-864 (2004).

Chemical crosslinking of polyethylene compositions can also be performed with any appropriate curing system, including the use of dicumyl peroxide and other additives as described by Florin Ciuprina et al., *Chemical Crosslinking of Polyethylene and its Effect on Water Tree Initiation and Propagation,* 17 IEEE TRANSACTIONS ON DIELECTRICS AND ELECTRICAL INSULATION, v. 709, pp. 710-11 (2010). Polyethylene crosslinking via organic peroxides is also described in Tumboli et al., *Crosslinked Polyethylene Indian Journal of Chemical Technology*, v. 11, pp. 853-864 (2004).

Another method for crosslinking polyethylene that can be used in the practice of the present invention is via use of e-beam irradiation, where the wire and cable upon extrusion are exposed to a dose of high-energy electrons, e.g. see Plastics Pipe Institute, *Crosslinked Polyethylene (PEX) Pipe and Tubing*, TN-17/2013, pp. 1-14 (2013).

It is to be understood that while the invention has been described in conjunction with the specific embodiments thereof, the foregoing description is intended to illustrate and not limit the scope of the invention. Other aspects, advantages, and modifications will be apparent to those skilled in the art to which the invention pertains.

Therefore, the following examples are put forth so as to provide those skilled in the art with a complete disclosure and description and are not intended to limit the scope of that which the inventors regard as their invention.

Example I

High MIR (25-80) polyethylene compositions based on a metallocene hafnium (Hf-P) catalyst system were produced with a single gas phase reactor as described in U.S. Pat. Nos.

6,936,675B2 and 6,528,597B2. During the trial, 9 different polyethylene compositions having density ranging from 0.912 g/cm³ to 0.920 g/cm³, MI ($I_2$, 190° C. 2.16 kg) ranging from 0.5 g/10 min to 1 g/10 min, and MIR ranging from 19 to 40 were produced and characterized. In addition, polyethylene compositions having densities of 0.918 g/cm³, MIs ($I_2$) of 0.5 g/10 min, and MIRs of 49 were produced in the pilot plant.

It was surprisingly noted that polyethylene compositions of similar density, MI, and MIR made using the hafnium (Hf-P) catalyst showed excellent melt fracture behavior (smooth surface) compared to ExxonMobil Enable™ metallocene polyethylene compositions of similar or even higher MI ($I_2$) and density. The inventive polyethylene compositions having between about 0.900 and 0.950 g/cm³ density, MI ($I_2$) between about 0.1 and about 10 g/10 min, and MIR between about 25 and about 80 have a primary target application involving profile extrusion such as wire and cable, tape, and filament. In these applications, besides mechanical properties, excellent extruder processability with very low melt fracture (MF) sensitivity leading to particularly smooth insulation/jacketing surface at high shear rates (e.g. >5,000 s⁻¹) and at relatively low die temperatures (e.g. temperatures <300° C. or <230° C. or <220° C.) is highly desirable.

The present inventive polyethylene compositions were advantageously made using a single site, single reactor gas phase process providing smooth extrudate at high shear rates. The combination of $M_z$, $M_w$, and $M_n$ that creates favorable $M_z/M_n$ and $M_z/M_w$ ratios is critical to provide smooth extrudate surface without melt fracture at high die shear rates. During this melt fracture experiment, it was noted that the Broad Orthogonal Co-monomer Distribution ("BOCD," a type of molecular architecture with high molecular weight chains containing higher comonomer incorporation relative to comonomer in low molecular weight chains) polyethylene compositions made out of Hf-P catalyst systems in a single gas phase (UNIPOL™) reactor exhibited excellent shear thinning characteristics leading to superior extruder processability and low MF sensitivity (very smooth extrudate), characteristics particularly useful in applications involving profile extrusion such as tape, wire and cable, or filament.

These inventive BOCD polyethylene compositions were made in a single reactor (preferably gas phase) using a single site catalyst system, while PE compositions for this application are traditionally made in two reactors connected in series or parallel. It was then envisioned that a single gas phase reactor had processing benefits in terms of simplicity in operation with lower capital cost and higher production rates over two reactors in series or in parallel. The catalyst pair does not need to be that of the Hf-P catalyst system, although a hafnium Mf-P-based catalyst is the preferred catalyst in this invention. The polyethylene compositions can also be made using mixed catalyst systems in a single gas phase reactor with trim technology as covered in U.S. Pat. No. 6,248,845 (mixed Hf) and U.S. Pat. No. 6,492,472 (mixed catalysts for use in a polymerization process). By broadening the MWD ($M_z/M_n$, $M_z/M_w$, and $M_w/M_n$) with changes in $M_z$, $M_w$, and $M_n$, and also creating BOCD in the composition, the balance of processability, surface smoothness, and mechanical properties can be further optimized. Being a single site metallocene catalyst, better control of crystallinity, as well as superior physical and mechanical properties with low impurities (better catalyst efficiencies) were also desired.

Example II

Tables 1, 2A, 2B, 3, and 4 identify the characteristics of different polyethylene compositions that were used for the present extrusion study. Each polyethylene composition contained some amount of PPA as described below.

Table 1 shows important physical properties (density, MI, and MIR) for Comparatives 1-5 and Inventive Samples 1-2. Tables 2A and 2B show the descriptions of the reactor conditions used to produce Comparatives 4 and 5 and Inventive Samples 1 and 2 using a gas phase pilot plant reactor. The granules are blended with primary and secondary antioxidants and PPA, compounded using a ZSK-57 twin screw extruder at 140 lb/hr, 150-250 rpm screw speed, and a target melt temperature range of 204° C.-232° C. (400-450° F.), and pelletized with a Gala underwater pelletizer.

To assess processability, surface smoothness, and melt fracture performance, extrudates were produced at various screw rotation speeds (10-200 rpm) with a HAAKE 252 single screw extruder. The screw diameter was ¾ inch, the ratio of length over screw diameter (L/D) was 25:1, and the compression ratio was 3:1. The mass throughput was determined in lbs/hr by collecting and weighing pellets exiting the pelletizer over a period of time, typically 1 minute. Rod dies of 1.871 mm and 1 mm diameter were used and the cylindrical strand (rod) exiting the die was collected on a steel board.

Table 3 shows apparent die (wall) shear rates (s⁻¹) as calculated from Eq. 1 using different screw speeds (RPM) and die diameters at 210° C. with the Haake 252 single screw extruder for assessment of extrudate surface smoothness and melt fracture. For a given screw speed (rpm), the mass throughput was determined by collecting and weighing polymer coming out of the die for 1 min. The melt density was assumed to be 760 kg/mm³. Table 4 shows the resultant apparent die (wall) shear rates at different extrusion screw speeds (RPMs) and die diameters.

Apparent Die (Wall) Shear Rate

The apparent die (wall) shear rates are defined, depending on the geometry of the die, by the following equations, as described in E. E. Rosenbaum et al., *Boron Nitride as a Processing Aid for the Extrusion of Polyolefins and Fluoropolymers*, POLYMER ENGINEERING AND SCI. V. 40, pp. 179-190 (2000); JOHN M. DEALY & KURT F. WISSBRUN, MELT RHEOLOGY AND ITS ROLE IN PLASTICS PROCESSING: THEORY AND APPLICATIONS, PP. 298-301 (Van Nostrand Reinhold 1990) (1990); J.-F Agassant et al., *Polymer Processing, Principles and Modeling*, pp. 34-40 (Hamer Publishers 1991); R. B Bird et al., *Dynamics of Polymeric Liquids, Volume 1: Fluid Mechanics*, pp. 175-184 (John Wiley & Sons, Inc., 2$^{nd}$ edition, 1987):

$$\dot{\gamma}_A = \frac{32Q}{\pi D^3} \quad \text{(Capillary/Circular)}, \tag{1}$$

$$\dot{\gamma}_A = \frac{6Q}{WH^2} \quad \text{(Slit)}, \tag{2}$$

$$\dot{\gamma}_A = \frac{6Q}{0.25(D_o - D_i)^2 0.5\pi(D_o + D_i)} \quad \text{(Annular)}, \tag{3}$$

where Q is the volumetric flow rate. The volumetric flow rate is given by Q=T/ρ, where T is the mass throughput rate (units of mass per unit time) and ρ is the melt density at the temperature of the die. For the range of die temperatures in the Examples of this invention, the melt density of polyethylene is assumed to be 760 kg/mm³. For circular die geometry [Eq. (1)], D is the diameter of the die. For slit (flat) die geometry [Eq. (2)], H is the height and W the width of the die. For annular die geometry [Eq. (3)], $D_o$ and $D_i$ are the outer and inner diameters, respectively.

As described below, a first set of experiments was conducted with a 1.871 mm rod die and a second set was conducted with a 1 mm rod die on the Haake 252 single screw extruder. The 1 mm diameter rod die had an 1/d=10, where 1 is the die land length and d is the die diameter. The cylindrical strand out of the rod die was passed through a water bath and then recovered manually. Most extrudates were made using a 170-200-210-210° C. temperature profile in the extruder, but a few samples were made using a 170-220-250-290° C. temperature profile as depicted in Table 4.

Comparative 1 is LL 1236.85 LLDPE polyethylene composition, commercially available by the ExxonMobil Chemical Company.

Comparative 2 is ENABLE 2010HA polyethylene composition, commercially available by the ExxonMobil Chemical Company.

Comparative 3 is ENABLE 2005HH polyethylene composition, commercially available by the ExxonMobil Chemical Company.

Inventive samples 1 and 2 are a polyethylene composition made with a metallocene hafnocene (Hf-P) catalyst system in a single gas phase reactor as described in U.S. Pat. Nos. 6,936,675 and 6,528,597. The samples contain 500 ppm of PPA (DYNAMAR FX-5929, manufactured by 3M Company), 500 ppm of primary antioxidant (IRGANOX 1076, manufactured by BASF Chemicals Company), and 1,000 ppm of secondary antioxidant (IRGAFOS 168, manufactured by BASF Chemicals Company).

TABLE 1

Physical Properties of Comparatives and Samples

| Composition | $I_2$ (190° C.) g/10 min | $I_{21.6}$ (190° C.) g/10 min | MIR = $I_{21.6}/I_2$ | Density (g/cm³) |
|---|---|---|---|---|
| Comparative 1 | 3.9 | 92.9 | 23.8 | 0.9271 |
| Comparative 2 | 1.03 | 35.47 | 34.44 | 0.921 |
| Comparative 3 | 0.5 | 19.1 | 38.2 | 0.9215 |
| Comparative 4 | 0.64 | 12.93 | 20.2 | 0.9192 |
| Comparative 5 | 0.65 | 18.2 | 28 | 0.9188 |
| Inventive Sample 1 | 0.61 | 24.3 | 39.8 | 0.9203 |
| Inventive Sample 2 | 0.55 | 26.94 | 49 | 0.9182 |

TABLE 2A

Polymerization Conditions of Comparative and Inventive Samples

| Resins | Part # | Density (g/cc) | $I_2$ (190° C.) | $I_{21.6}$ (190° C.) | MIR = $I_{21.6}/I_2$ | Bed temperature (° C./° F.) |
|---|---|---|---|---|---|---|
| Comparative 4 | Part 16-17 | 0.9192 | 0.64 | 12.93 | 20.2 | 88.8/192.0 |
| Comparative 5 | Part 16-18 | 0.9188 | 0.65 | 18.2 | 28 | 79.7/175.6 |
| Inventive Sample 1 | Part 16-19 | 0.9203 | 0.61 | 24.3 | 39.8 | 73.8/165.0 |
| Inventive Sample 2 | Part 16-106B | 0.9182 | 0.55 | 26.94 | 49 | 71.1/160.0 |

TABLE 2B

Polymerization Conditions of Comparative and Inventive Samples

| Resins | Reactor Pressure (psig) | $C_2$ Partial Pressure (psig) | $H_2/C_2$ (ppm/mol %) | $C_6/C_2$ (molar) | $C_6/C_2$ (lb/lb) | Catalyst prod. (lb/lb) | Residence Time (hr) |
|---|---|---|---|---|---|---|---|
| Comparative 4 | 290.0 | 194.8 | 4.0 | 0.0138 | 0.0750 | 7525.6 | 4.3 |
| Comparative 5 | 289.8 | 194.6 | 3.6 | 0.0166 | 0.0910 | 8192.9 | 4.6 |
| Inventive Sample 1 | 290.0 | 195.0 | 3.6 | 0.0178 | 0.0980 | 7928.2 | 5.0 |
| Inventive Sample 2 | 289.8 | 194.9 | 4.0 | 0.0178 | 0.1100 | 8449.0 | 4.8 |

Comparative 4 is a polyethylene composition made with a metallocene hafnium Hf-P catalyst system in a single gas phase reactor as described in U.S. Pat. Nos. 6,936,675 and 6,528,597. The sample contains 500 ppm of PPA (DYNAMAR FX-5929), 500 ppm of primary antioxidant (IRGANOX 1076) and 1,000 ppm of secondary antioxidant (IRGAFOS 168).

Comparative 5 is a polyethylene composition made with a metallocene hafnium (Hf-P) catalyst system in a single gas phase reactor as described in U.S. Pat. Nos. 6,936,675 and 6,528,597. The sample contains 500 ppm of PPA (DYNAMAR FX-5929), 500 ppm of primary antioxidant (IRGANOX 1076) and 1,000 ppm of secondary antioxidant (IRGAFOS 168).

TABLE 3

Molecular Characteristics of the Polyethylene Compositions

| Composition | GPC-4D $(M_n)$ g/mol | GPC-4D $(M_w)$ g/mol | GPC-4D $(M_w/M_n)$ | GPC-4D $(M_z)$ | GPC-4D $(M_z/M_n)$ | GPC-4D $(M_z/M_w)$ |
|---|---|---|---|---|---|---|
| Comparative 1 | 23733 | 88932 | 3.75 | 240821 | 10.14 | 2.71 |
| Comparative 2 | 23325 | 95350 | 4.1 | 191919 | 7.75 | 2.01 |
| Comparative 3 | 27990 | 102207 | 3.65 | 216989 | 8.23 | 2.12 |
| Comparative 4 | 38239 | 128067 | 3.35 | 267376 | 6.99 | 2.09 |
| Comparative 5 | 32637 | 130344 | 3.99 | 339352 | 8.07 | 2.6 |
| Inventive Sample 1 | 29333 | 136734 | 4.66 | 401836 | 13.70 | 2.94 |

TABLE 3-continued

Molecular Characteristics of the Polyethylene Compositions

| Composition | GPC-4D ($M_n$) g/mol | GPC-4D ($M_w$) g/mol | GPC-4D ($M_w/M_n$) | GPC-4D ($M_z$) | GPC-4D ($M_z/M_n$) | GPC-4D ($M_z/M_w$) |
|---|---|---|---|---|---|---|
| Inventive Sample 2 | 30183 | 149550 | 4.95 | 482641 | 15.99 | 3.23 |

TABLE 4

Estimated Apparent Die (Wall) Shear Rates at Die Temperature of 210° C.

| Die Diameter (mm) | RPM | Shear rate ($s^{-1}$) |
|---|---|---|
| 1.871 | 60 | 988 |
|  | 90 | 1504 |
|  | 120 | 2005 |
|  | 150 | 2507 |
| 1.000 | 10 | 1065 |
|  | 15 | 1497 |
|  | 20 | 1902 |
|  | 50 | 4256 |
|  | 55 | 5026 |
|  | 60 | 5205 |
|  | 70 | 6120 |

As shown in FIGS. 1 to 6, optical micrographs were used to visualize the resulting extrudates when die diameter, screw rotation speed (rpm), apparent die (wall) shear rate, temperature, and composition were varied.

FIG. 1 displays the optical micrographs of extrudates from Comparative 1 ($M_z$—240821 g/mol & $M_z/M_n$—10.1) using a 1 mm diameter die and 210° C. die temperature. The extrudate of Comparative 1 was produced with a Haake Single Screw with a temperature profile of 170-200-210-210° C. using a 1 mm diameter rod die at 4289 $s^{-1}$ (50 rpm) (FIG. 1A), 5205 $s^{-1}$ (60 rpm) (FIG. 1B), and 6120 $s^{-1}$ (70 rpm) (FIG. 1C). As shown in FIG. 1A, at 50 rpm, the profile diameter is intact. However, there were some surface defects as noted at the edges that became severe at 60 and 70 rpm (FIG. 1B and FIG. 1C). The polyethylene composition is of a higher density (0.927 g/cm³) and a higher MI (3.9 g/10 min) than the other grades (0.920 g/cm³) that are described below.

FIG. 2 displays the stereo-optical micrographs of the surface of Comparative 2 (0.920 g/cm³ and 1 MI), which was made at different shear rates using a die diameter of 1.871 mm. Specifically, the polyethylene composition was extruded with a Haake 252 Single Screw extruder using a 1.871 mm die diameter and l/d of approximately 2 with temperature profiles of 170-200-210-210° C. (FIG. 2A) and 170-220-250-290° C. (FIG. 2B). We noted that there was significant shark skin melt fracture even at a low shear rate of 1040 $s^{-1}$. An increase in die temperature from 210° C. to 290° C. appeared to help in mitigating the shark skin effect.

FIG. 3 shows the micrographs of extrudates produced using a 1 mm die diameter. The surface defects are noticeable at shear rates >1497 $s^{-1}$. The slight difference in the melt fracture vs. shear rate behavior for the two dies are expected due to different extensional flow behavior in the profiles.

Figure 4B:
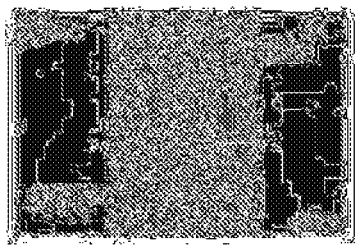
Figure 4C:
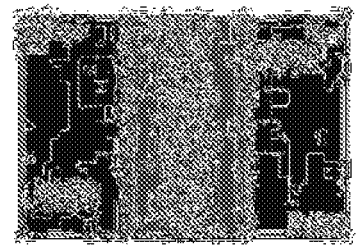
Figure 4D:
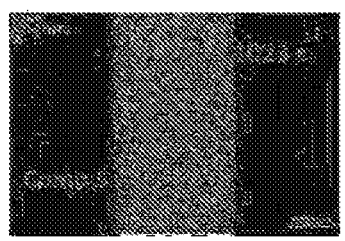

Polyethylene compositions were extruded with a Haake Single Screw extruder and 1.871 mm die diameter with a temperature profile of 170-200-210-210° C. and a shear rate range of 988 $s^{-1}$. FIG. 4A, FIG. 4B, FIG. 4C and FIG. 4C show the stereo-optical micrographs of extrudates of three different polyethylene compositions (Comparative 3, Comparative 5 and Sample 1) having MIRs of approximately 20, 28, and 40, respectively, and subjected to a similar apparent die (wall) shear rate of 988 $s^{-1}$ using a 1.871 mm diameter die with a die temperature of 210° C. Comparative 3 was also sheared at 1023 $s^{-1}$. Comparatives 3 and 5 show significant melt fracture defects on the surface, while Inventive Sample 1 with an MIR of 39 ($M_z$—401836 g/mol, $M_z/M_n$—13.7) surprisingly displays significantly smoother profile.

Figure 5A:
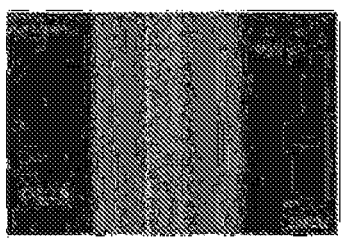
FIG. 5A, FIG. 5B and FIG. 5C are optical micrographs of the present polyethylene compositions evaluated under apparent die (wall) shear rates of 958 s$^{-1}$, 1504 s$^{-1}$, and 2505 s$^{-1}$, respectively.
Figure 5B:
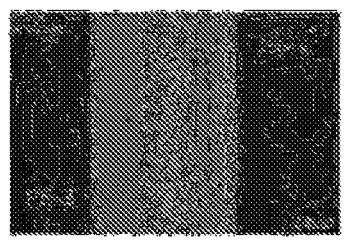
Figure 5C:
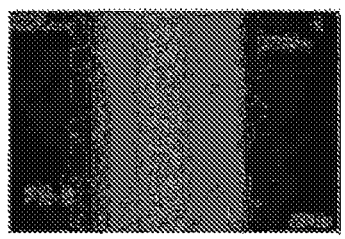
Figure 6A:
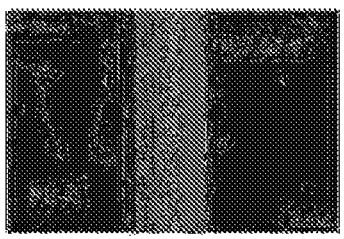
FIG. 6A and FIG. 6B are optical micrographs of the present polyethylene compositions evaluated under apparent die (wall) shear rates of 4222 s$^{-1}$ and 5026 s$^{-1}$, respectively.
Figure 6B:
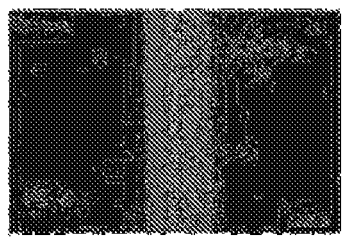

FIG. 5 shows the stereo-optical micrographs of the extrudates made from Inventive Sample 1 (MIR—39, $M_z$—401836 g/mol, $M_z/M_n$—13.7) at three shear rates: 958 $s^{-1}$, 1504 $s^{-1}$ and 2505 $s^{-1}$ using a 1.871 mm die diameter and 210° C. die temperature. Smooth extrudates without shark-skin effect can be noted at all three shear rates.

Finally, Inventive Sample 2 ($M_z$—482641 g/mol, $M_z/M_n$—15.99, 0.6 $I_2$, and 49 MIR) was evaluated under shear rates of 4222 $s^{-1}$ and 5026 $s^{-1}$ with a 1 mm diameter rod die at 210° C. die temperature. As noted in FIG. 6, at 4222 $s^{-1}$, the profile is very smooth without any surface defects. It was further noted even at 5026 $s^{-1}$, the profile diameter is intact, however, with some moderate surface defects.

Stereomicroscopy images of the extrudate rods (extrudates) were acquired using an Olympus SZX-12 stereo microscope equipped with a 0.055 numerical aperture Plan Fluorite 0.5× objective and Leica DFC295 camera. A ring light was used to provide reflected lighting. The camera settings and aperture stop settings were held constant for all translucent white samples. Various lighting conditions were used for the colored samples to provide adequate contrast. Assessment of rod surface smoothness, sharkskin and melt fracture was done via visual observation of the stereo-optical microscopy image, which is consistent with the procedure typically reported in the literature for melt fracture assessment. See E. E. Rosenbaum et al., *Boron Nitride as a Processing Aid for the Extrusion of Polyolefins and Fluoropolymers*, POLYMER ENGINEERING AND SCI., v. 40, pp. 179-190 (2000); Delgadillo-Velázquez et al., *Sharkskin and Oscillating Melt Fracture: Why in Slit and Capillary Dies and Not in Annular Dies?*, POLYMER ENGINEERING AND SCI., v. 40, pp. 405-414 (2008); Rudy Koopmans et al., *Polymer Melt Fracture*, 2-9, pp. 139-148 CRC Press Taylor & Francis Group (2011).

Example III

With the same catalyst system as shown in the previous examples and as described in U.S. Pat. Nos. 6,936,675 and 6,528,597, multiple experimental resins (PE1 to PE 14) were produced in a gas phase reactor. Table 5 shows physical properties (density, $I_2$, MIR) of different polyethylene resins produced by changing the process conditions in the reactor. A range of compositions were produced by changing density (0.9200 g/cc to 0.9270 g/cc), $I_2$ (2.5 to 6 g/10 min), and MIR (25 to 40). The process conditions are shown in Table 6. Table 7 provides molecular weight data as measured from GPC-3D.

TABLE 5

Physical Properties of Inventive Samples

| Pellet NB# | Samples | $I_2$ (g/10 min) | $I_{21}$ (g/10 min) | MIR ($I_{21}/I_2$) | Density (g/cc) |
|---|---|---|---|---|---|
| 26586-301-C01 | PE1 | 3.49 | 114.8 | 32.9 | 0.9258 |
| 26586-301-C02 | PE2 | 3.02 | 117.7 | 39.0 | 0.9216 |

TABLE 5-continued

Physical Properties of Inventive Samples

| Pellet NB# | Samples | $I_2$ (g/10 min) | $I_{21}$ (g/10 min) | MIR ($I_{21}/I_2$) | Density (g/cc) |
|---|---|---|---|---|---|
| 26586-301-C03 | PE3 | 2.95 | 80.6 | 27.3 | 0.9203 |
| 26586-301-C04 | PE4 | 2.93 | 81.9 | 28.0 | 0.9200 |
| 26586-301-C05 | PE5 | 3.13 | 86.9 | 27.8 | 0.9212 |
| 26586-301-C06 | PE6 | 3.2 | 100.8 | 31.5 | 0.9207 |
| 26586-301-C07 | PE7 | 2.79 | 81.4 | 29.2 | 0.9261 |
| 26586-301-C08 | PE8 | 5.23 | 164.0 | 31.4 | 0.9256 |
| 26586-301-C09 | PE9 | 5.18 | 189.0 | 36.5 | 0.9252 |
| 26586-301-C10 | PE10 | 5.23 | 185.4 | 35.4 | 0.9247 |
| 26586-301-C11 | PE11 | 5.2 | 184.1 | 35.4 | 0.9250 |
| 26586-301-C12 | PE12 | 4.77 | 159.6 | 33.5 | 0.9255 |
| 26586-301-C13 | PE13 | 4.44 | 150.7 | 33.9 | 0.9202 |
| 26586-301-C14 | PE14 | 4.36 | 148.6 | 34.1 | 0.9202 |

TABLE 6

Polymerization Conditions of Inventive Samples

| Reactor Granules NB# | Pellet NB# | Bed Temp (° C./° F.) | Reactor press. (psig) | $C_2$ Partial Pressure (psig) | $H_2/C_2$ ppm (mol %) | $C_6/C_2$ (molar) | $C_6/C_2$ (lb/lb) | Cat. Prod. (lb/lb) | Resi. Time (hrs) |
|---|---|---|---|---|---|---|---|---|---|
| 26586-301-001 | 26586-301-C01 | 74.4/166 | 289.9 | 195 | 5.8 | 0.0141 | 0.0767 | 10680 | 4.58 |
| 26586-301-002 | 26586-301-C02 | 74.4/166 | 290.1 | 195 | 7.2 | 0.0165 | 0.1003 | 5824 | 5.59 |
| 26586-301-003 | 26586-301-C03 | 78.3/173 | 289.8 | 195 | 6.9 | 0.0151 | 0.0939 | 7527 | 5.25 |
| 26586-301-004 | 26586-301-C04 | 78.3/173 | 290.1 | 195 | 6.9 | 0.0151 | 0.0939 | 8361 | 4.73 |
| 26586-301-005 | 26586-301-C05 | 78.3/173 | 289.8 | 195 | 6.9 | 0.0150 | 0.0940 | 8452 | 4.67 |
| 26586-301-006 | 26586-301-C06 | 76.6/170 | 289.9 | 195 | 7.1 | 0.0153 | 0.0969 | 9339 | 4.23 |
| 26586-301-007 | 26586-301-C07 | 76.6/170 | 290.1 | 195 | 5.0 | 0.0142 | 0.0711 | 7915 | 5.00 |
| 26586-301-008 | 26586-301-C08 | 76.6/170 | 290.0 | 195 | 6.9 | 0.0152 | 0.0801 | 6141 | 5.31 |
| 26586-301-009 | 26586-301-C09 | 74.4/166 | 290.0 | 195 | 7.3 | 0.0158 | 0.0903 | 5801 | 4.69 |
| 26586-301-010 | 26586-301-C10 | 74.4/166 | 290.0 | 195 | 7.3 | 0.0157 | 0.0902 | 5278 | 5.15 |
| 26586-301-011 | 26586-301-C11 | 74.4/166 | 290.0 | 195 | 7.3 | 0.0159 | 0.0901 | 5456 | 4.99 |
| 26586-301-012 | 26586-301-C12 | 75.0/167 | 290 | 195 | 7.15 | 0.016 | 0.0886 | 6356 | 5.51 |
| 26586-301-013 | 26586-301-C13 | 74.4/166 | 290 | 195 | 8.44 | 0.015 | 0.1049 | 8529 | 5.15 |
| 26586-301-014 | 26586-301-C14 | 74.4/166 | 290 | 195 | 8.39 | 0.015 | 0.1049 | 9277 | 4.74 |

TABLE 7

Molecular Weights of Inventive Samples

| Pellet NB# | Samples | $I_2$ (g/10 min) | MIR $I_{21}/I_2$ | Density (g/cc) | GPC-3D $M_n$ (g/mol) | GPC-3D $M_w$ (g/mol) | GPC-3D $M_z$ (g/mol) | $M_z/M_w$ | $M_z/M_n$ | $M_w/M_n$ |
|---|---|---|---|---|---|---|---|---|---|---|
| 26586-301-C01 | PE1 | 3.49 | 32.9 | 0.9258 | 25277.6 | 86100.3 | 225112 | 2.61 | 8.91 | 3.41 |
| 26586-301-C02 | PE2 | 3.02 | 39.0 | 0.9216 | 18784.7 | 78779.4 | 194826 | 2.47 | 10.37 | 4.19 |
| 26586-301-C03 | PE3 | 2.95 | 27.3 | 0.9203 | 26654.7 | 87028.3 | 203308 | 2.34 | 7.63 | 3.27 |
| 26586-301-C04 | PE4 | 2.93 | 28.0 | 0.9200 | 27682.8 | 90339.1 | 217198 | 2.40 | 7.85 | 3.26 |
| 26586-301-C05 | PE5 | 3.13 | 27.8 | 0.9212 | 28118.5 | 83796 | 181656 | 2.17 | 6.46 | 2.98 |
| 26586-301-C06 | PE6 | 3.2 | 31.5 | 0.9207 | 22042.1 | 81221.3 | 188986 | 2.33 | 8.57 | 3.68 |
| 26586-301-C07 | PE7 | 2.79 | 29.2 | 0.9261 | 29074.8 | 89234.7 | 210817 | 2.36 | 7.25 | 3.07 |
| 26586-301-C08 | PE8 | 5.23 | 31.4 | 0.9256 | 20370.5 | 76819.8 | 201488 | 2.62 | 9.89 | 3.77 |
| 26586-301-C09 | PE9 | 5.18 | 36.5 | 0.9252 | 21981.1 | 75878.5 | 192307 | 2.53 | 8.75 | 3.45 |
| 26586-301-C10 | PE10 | 5.23 | 35.4 | 0.9247 | 22145.9 | 78345.3 | 211701 | 2.70 | 9.56 | 3.54 |
| 26586-301-C11 | PE11 | 5.2 | 35.4 | 0.9250 | 24438.5 | 80562.6 | 215255 | 2.67 | 8.81 | 3.30 |
| 26586-301-C12 | PE12 | 4.77 | 33.5 | 0.9255 | 15954.5 | 72951.6 | 185798 | 2.55 | 11.65 | 4.57 |
| 26586-301-C13 | PE13 | 4.44 | 33.9 | 0.9202 | 23061.2 | 78816.3 | 187493 | 2.38 | 8.13 | 3.42 |
| 26586-301-C14 | PE14 | 4.36 | 34.1 | 0.9202 | 17522.9 | 71588.3 | 167261 | 2.34 | 9.55 | 4.09 |

Each polyethylene composition (PE1 to PE14) was compounded in a ZSK30 Coperion compounding twin screw extruder with antioxidants Irganox-1010 at 500 ppm and Irganox-1076 at 1,000 ppm. A feeder setting of 150 corresponding to approximately 30 lbs/hr, a die temperature of 204° C. (400° F.), and an extruder screw speed of 200 rpm were used during the compounding. No polymer processing aid was added for this experiment.

Figure 7:
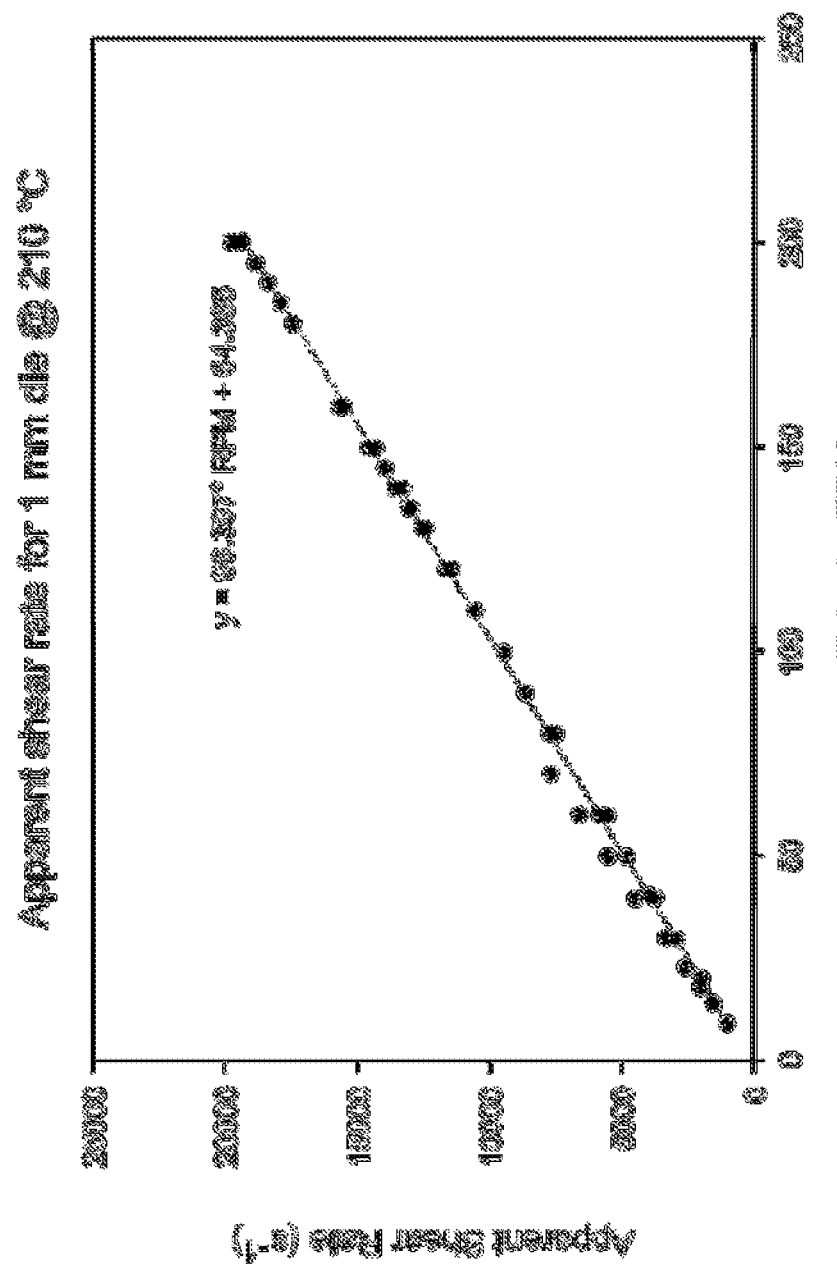
FIG. 7 is a plot showing the apparent die (wall) shear rate as a linear function of the extruder screw speed (RPM) for a 1 mm diameter die at 210° C.

To assess processability, surface smoothness, and melt fracture performance, extrudates were produced at various screw rotation speeds (10-200 rpm) with a HAAKE 252 single screw extruder using the following zone temperatures: 170-200-210-210° C. The screw diameter was ¾ inch, the ratio of length over screw diameter (L/D) was 25:1, and the compression ratio was 3:1. The mass throughput was determined in lbs/hr by collecting and weighing pellets exiting the pelletizer over a period of time, typically 1 minute. A rod die of 1 mm diameter was used with l/d=10, where l is the die land length and d is the rod die diameter. The cylindrical strand (rod) exiting the die was collected on a steel board. The full shear rate data at the die temperature of 210° C. is shown in FIG. 7. The rods were visually observed for smoothness at different RPMs (shear rates). The melt fracture characteristics of each of the different polyethylene compositions are provided in Tables 8A and 8B.

TABLE 8A

Melt Fracture Data of Inventive Samples

| Sample NB# | Samples | $I_2$ (g/10 min) | MIR ($I_{21}/I_2$) | Density (g/cc) |
|---|---|---|---|---|
| 26586-301-C01 | PE1 | 3.49 | 32.9 | 0.9258 |
| 26586-301-C02 | PE2 | 3.02 | 39.0 | 0.9216 |
| 26586-301-C03 | PE3 | 2.95 | 27.3 | 0.9203 |

TABLE 8A-continued

Melt Fracture Data of Inventive Samples

| Sample NB# | Samples | $I_2$ (g/10 min) | MIR ($I_{21}/I_2$) | Density (g/cc) |
|---|---|---|---|---|
| 26586-301-C04 | PE4 | 2.93 | 28.0 | 0.9200 |
| 26586-301-C05 | PE5 | 3.13 | 27.8 | 0.9212 |
| 26586-301-C06 | PE6 | 3.2 | 31.5 | 0.9207 |
| 26586-301-C07 | PE7 | 2.79 | 29.2 | 0.9261 |
| 26586-301-C08 | PE8 | 5.23 | 31.4 | 0.9256 |
| 26586-301-C09 | PE9 | 5.18 | 36.5 | 0.9252 |
| 26586-301-C10 | PE10 | 5.23 | 35.4 | 0.9247 |
| 26586-301-C11 | PE11 | 5.2 | 35.4 | 0.9250 |
| 26586-301-C12 | PE12 | 4.77 | 33.5 | 0.9255 |
| 26586-301-C13 | PE13 | 4.44 | 33.9 | 0.9202 |
| 26586-301-C14 | PE14 | 4.36 | 34.1 | 0.9202 |

TABLE 8B

Melt Fracture Data of Inventive Samples

| Smooth to Rough Gradient | Melt Fracture Apparent Shear Rate (s$^{-1}$) | Average Shear Rate for Melt Fracture (s$^{-1}$) | $I_2 * M_z/M_n$ |
|---|---|---|---|
| Still smooth at 200 rpm, no visible changes in smoothness from 100-200 rpm | ≥19343 | — | 31.1 |
| Smooth → Rough 190 → 200 rpm, smooth at 190 rpm and melt fracture at 200 rpm | 18380-19343 | 18861.5 | 31.3 |
| Smooth → Rough 120 → 150 rpm, melt fracture starts at 130 rpm | 11632-12596 | 12114 | 22.5 |
| Smooth → Rough 120 → 150 rpm, melt fracture starts at 135 rpm | 11632-13077 | 12354.5 | 23.0 |
| Smooth → Rough 130 → 150 rpm, melt fracture starts at 135 rpm | 12596-13077 | 12836.5 | 20.2 |
| Smooth → Rough 180 → 200 rpm, melt fracture starts at 190 rpm | 17416-18380 | 17898 | 27.4 |
| Smooth → Rough 100 → 150 rpm, melt fracture starts at 110 rpm | 9705-10668 | 10186.5 | 20.2 |
| Still smooth at 200 rpm, no visible changes in smoothness from 100-200 rpm | ≥19343 | — | 51.7 |
| Still smooth at 200 rpm, no visible changes in smoothness from 100-200 rpm | ≥19343 | — | 45.3 |
| Still smooth at 200 rpm, no visible changes in smoothness from 100-200 rpm | ≥19343 | — | 50.0 |
| Still smooth at 200 rpm, no visible changes in smoothness from 100-200 rpm | ≥19343 | — | 45.8 |
| Still smooth at 200 rpm, no visible changes in smoothness from 100-200 rpm | ≥19343 | — | 55.6 |
| Still smooth at 200 rpm, no visible changes in smoothness from 100-200 rpm | ≥19343 | — | 36.1 |
| Still smooth at 200 rpm, no visible changes in smoothness from 100-200 rpm | ≥19343 | — | 41.6 |

It can be noted that all samples (PE1-PE14) can be extruded through the 1 mm die diameter at 210° C. without notable melt fracture above an apparent shear rate of 9705 s$^{-1}$. Even though samples are expected to exceed an apparent die (wall) shear rate of 19343 s$^{-1}$ and show no melt fracture, even up to about 50,000 s$^{-1}$, the present die and extruder configuration limits to a shear rate of 19343 s$^{-1}$.

Figure 8:
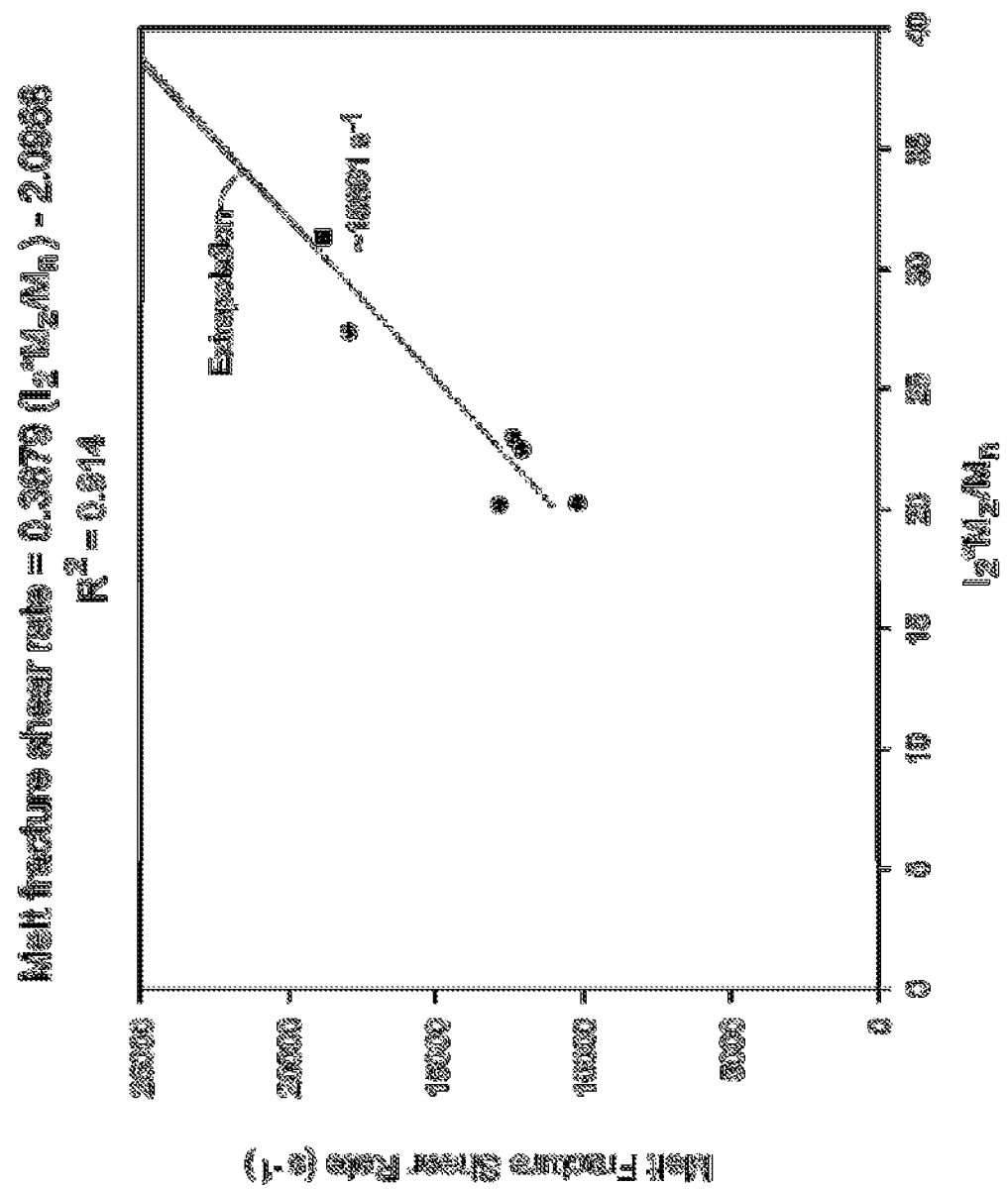
FIG. 8 is a plot showing the melt fracture shear rate as a linear function of $I_2*M_z/M_n$.
Figure 8:
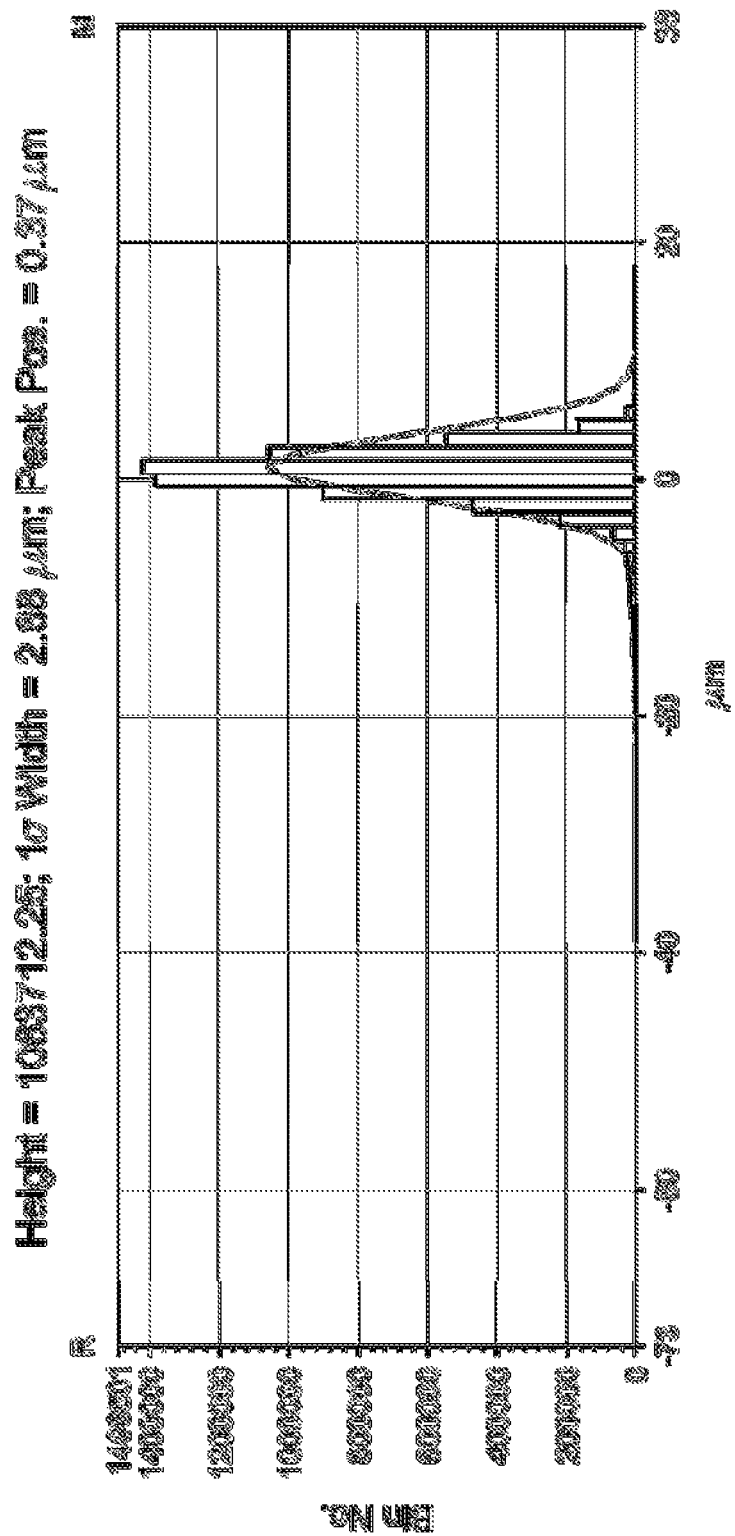

Based on the data from the samples showing onset of melt fracture at shear rates lower than 19343 s$^{-1}$, a correlation was developed between melt fracture shear rate and $I_2*(M_z/M_n)$. FIG. 8 shows the melt fracture shear rate as a linear function of $I_2*(M_z/M_n)$. Based on the linear fit, the melt fracture shear rate is expected to follow this correlation: Melt fracture shear rate=$0.3879(I_2*(M_z/M_n))-2.0968$, where $I_2$ is the MI ($I_2$, 190° C., 2.16 kg) of the resin and $M_z$ and $M_n$ are molecular weight averages from GPC-3D measurements. For the BOCD composition polyethylene resins, $I_2$, $M_z$, $M_n$, and the comonomer content and distribution (density) can be fine-tuned to achieve high shear rate conditions with no visible melt fracture.

Example IV

Figure 10:
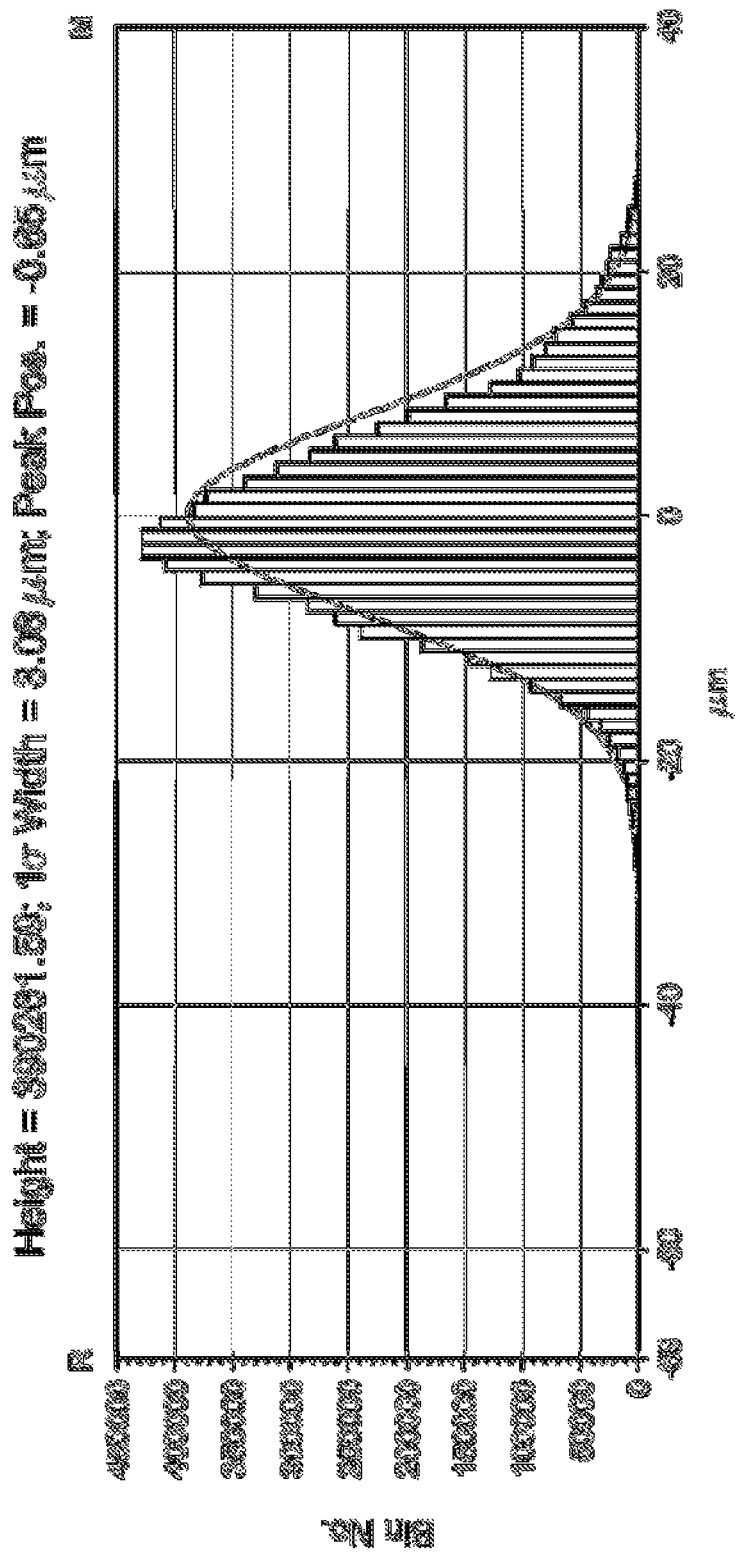
FIG. 10 is a histogram showing the incidence and magnitude of surface defects for Sample B.

Samples A and B are wires comprising the inventive polyethylene compositions. FIG. 9 and FIG. 10 quantitatively describe the surface roughness of Samples A and B, respectively. The figures are histograms showing the incidence and magnitude of surface defects in the samples. From FIG. 9 and FIG. 10, Samples A and B appear to have relatively smooth surfaces. Both Figures show narrow, approximately-Gaussian distributions with few outliers and good symmetry. In particular, FIG. 9 shows that Sample A has a very smooth surface, with the bulk of defects being only a few microns. FIG. 10 shows that Sample B has a rougher profile, with most defects falling within +/−20 microns.

The optical topography images were captured using a Bruker Contour GT-K optical profilometer. The instrument measures z-height (topography) of a surface using a Mirau interferometer to detect interference fringes when the z-height of the surface matches the internal light path length of the interferometer. The images were captured using the 10× objective (0.9 micron optical resolution) with a 2× zoom (0.5 micron pixel resolution, 0.3×0.2 mm field of view). In order to capture the large scale image, a series of images were taken and stitched together using the Vision 64 software. The overall image dimensions were 1.2×3 mm for sample A07, and 0.9×3 mm for sample A12. The stitch overlap was 20%. Images were processed using a Flattening routine (Remove cylinder/tilt) to account for the curvature of the samples and to represent them as flat surfaces. They then underwent a Restore Data routine to fill in missing data in the image, and finally a Mask to remove the edges of the image where the curvature was high. All operations are standard Image Processing tools built into the Vision64 software.

The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the invention, additionally, they do not exclude impurities and variances normally associated with the elements and materials used.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All priority documents are herein fully incorporated by reference for all jurisdictions in which such incorporation is permitted and to the extent such disclosure is consistent with the description of the present invention. Further, all documents and references cited herein, including testing procedures, publications, patents, journal articles, etc. are herein fully incorporated by reference for all jurisdictions in which such incorporation is permitted and to the extent such disclosure is consistent with the description of the present invention.

While the invention has been described with respect to a number of embodiments and examples, those skilled in the art, having benefit of this disclosure, will appreciate that other embodiments can be devised which do not depart from the scope and spirit of the invention as disclosed herein.

What is claimed is:

1. A wire or a cable comprising a polyethylene composition having a density from 0.910 to 0.930 g/cm$^3$, a MI ($I_2$, 190° C., 2.16 kg) from 2 to 6 g/10 min, an MIR ($I_{21}/I_2$) from 25 to 50, an $M_z$, greater than or equal to about 150,000 g/mol, and either an $M_z/M_n$ ratio greater than or equal to about 8.0, an $M_z/M_w$ ratio greater than or equal to about 2.4, or an ($I_2*M_z/M_n$) from about 3 to about 100,
wherein the polyethylene composition comprises $C_3$ to $C_{10}$ carbon alpha-olefin comonomer derived units, has a Broad Orthogonal Comonomer Distribution (BOCD), and is produced using a single site hafnium metallocene catalyst system.

2. The polyethylene composition of claim 1, wherein the polyethylene composition further comprises about 5.0 ppm hafnium or less.

3. The polyethylene composition of claim 1, wherein the polyethylene composition comprises 1-hexene derived units.

4. The polyethylene composition of claim 1, wherein the polyethylene composition is a blend comprising LLDPE, VLDPE, LDPE, MDPE, HDPE, EVA copolymers, EMA copolymers, EEA copolymers, EBA copolymers, or a combination thereof.

5. The polyethylene composition of claim 1, wherein the polyethylene composition corresponds to an apparent die (wall) shear rate from about 500 s$^{-1}$ to 20,000 s$^{-1}$ during extrusion.

6. The polyethylene composition of claim 1, wherein the polyethylene composition provides a smooth extrudate at an apparent die (wall) shear rate from about 500 s$^{-1}$ to about 20,000 s$^{-1}$ during extrusion without shark-skin or melt fracture by visual observation of stereo-microscopy images of the extrudate.

7. The polyethylene composition of claim 1, wherein the polyethylene composition comprises an additive selected from the group consisting of a PPA, antioxidant, nucleator, anti-stat, slip, and mixtures thereof.

8. The polyethylene composition of claim 1, wherein the polyethylene composition comprises an insulating or jacketing layer or coating that has an average thickness from about 100 tm to about 5000 pm.

9. The polyethylene composition of claim 1, wherein the polyethylene composition is extruded through a die having cylindrical, annular, or slit (flat) geometry.

10. The polyethylene composition of claim 1, wherein the polyethylene composition further comprises a silane grafting composition comprising a silane compound, a free radical initiator, and a silanol condensation catalyst, wherein the silane compound comprises an unsaturated group and a hydrolysable group.

11. The polyethylene composition of claim 1, wherein the polyethylene composition comprises a peroxide compound.

12. A method for producing a wire or a cable including at least one layer, the method comprising:
(a) polymerizing ethylene in the presence of a metallocene catalyst system in a gas phase reactor with at least one comonomer of a $C_3$ to $C_{10}$ alpha-olefin to produce a polyethylene composition having a density from 0.910 to 0.930 g/cm$^3$ about 0.900 g/cm$^3$ to about 0.950 g/cm$^3$, ($I_{21}/I_2$) from 25 to 50, an $M_z$ greater than or equal to about 150,000 g/mol, and either an $M_z/M_n$ ratio greater than or equal to about 8.0, an $M_z/M_w$ ratio greater than or equal to about 2.4, or an ($I_2*M_z/M_n$) between about 3 and about 100, wherein the polyethylene composition comprises $C_3$ to $C_{10}$ carbon alpha-olefin comonomer derived units, has a Broad Orthogonal Comonomer Distribution (BOCD), and is produced using a single site hafnium metallocene catalyst system; and
(b) extruding the polyethylene composition to produce the at least one layer.

13. The method of claim 12, further comprising the step of compounding the polyethylene composition with one or more additives using at least one single and/or twin screw extruder or combination thereof.

14. The method of claim 12, further comprising the step of crosslinking the polyethylene composition with e-beam irradiation after extrusion.

15. The method of claim 12, further comprising the steps of:
(a) adding a silane grafting composition to the polyethylene composition, wherein the silane grafting composition comprises a silane compound, a free radical initiator, and a silanol condensation catalyst and the silane compound comprises an unsaturated group and a hydrolysable group, to produce the at least one layer; and (b) exposing the at least one layer to moisture after extrusion to crosslink the polyethylene composition.

* * * * *